United States Patent
Bradsher

(10) Patent No.: US 9,619,527 B2
(45) Date of Patent: *Apr. 11, 2017

(54) METHOD OF RANKING AND DISPLAYING CERTIFIED CONTENT

(71) Applicant: Trophy Stack, Inc., Pike Road, AL (US)

(72) Inventor: Michael J. Bradsher, Pike Road, AL (US)

(73) Assignee: Trophy Stack, Inc., Pike Road, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,927

(22) Filed: Jan. 9, 2016

(65) Prior Publication Data

US 2016/0124967 A1 May 5, 2016

Related U.S. Application Data

(60) Division of application No. 14/023,744, filed on Sep. 11, 2013, now Pat. No. 9,262,773, which is a
(Continued)

(51) Int. Cl.
*G06F 7/00* (2006.01)
*G06F 17/30* (2006.01)
(Continued)

(52) U.S. Cl.
CPC .... *G06F 17/3053* (2013.01); *G06F 17/30368* (2013.01); *G06F 17/30528* (2013.01);
(Continued)

(58) Field of Classification Search
CPC ...... A01K 83/00; A01K 85/16; A47G 33/004; G01G 19/60
(Continued)

(56) References Cited

U.S. PATENT DOCUMENTS 6,222,449 B1 4/2001 Twining
6,459,372 B1 10/2002 Branham et al.
(Continued)

FOREIGN PATENT DOCUMENTS

JP 2006158239 A 6/2006
WO 02099721 A1 12/2002
WO 2011005876 A1 1/2011

OTHER PUBLICATIONS

"Boone and Crockett Club _ Home", 2008.*
(Continued)

*Primary Examiner* — Binh V Ho
(74) *Attorney, Agent, or Firm* — Craig A. Phillips; Dickinson Wright PLLC

(57) ABSTRACT

A social media platform and method for displaying and ranking content from an individual user against content from other users. The method prompts the individual user to input user-generated information; receives the user-generated information; acquires related information; receives at least one visual recording related to the user-generated information; associates the user-generated information, the related information, and the captured visual recording to create a user single trophy entry in a remote database; ranks the user single trophy entry relative to a plurality of single trophy entries in the remote database to determine a relative rank; and displays the user single trophy entry with the determined rank. The social media platform displays and ranks trophies taken by a plurality of users utilizing a database, a ranking module, and an output module.

16 Claims, 20 Drawing Sheets

Related U.S. Application Data continuation-in-part of application No. 13/896,960, filed on May 17, 2013, now Pat. No. 9,424,292.

(60) Provisional application No. 61/648,253, filed on May 17, 2012, provisional application No. 61/678,833, filed on Aug. 2, 2012, provisional application No. 61/692,886, filed on Aug. 24, 2012.

(51) Int. Cl.
*G06Q 30/02* (2012.01)
*G06Q 50/00* (2012.01)
*H04W 4/02* (2009.01)

(52) U.S. Cl.
CPC .. *G06F 17/30864* (2013.01); *G06F 17/30867* (2013.01); *G06F 17/30882* (2013.01); *G06Q 30/0214* (2013.01); *G06Q 30/0253* (2013.01); *G06Q 30/0261* (2013.01); *G06Q 30/0267* (2013.01); *G06Q 30/0269* (2013.01); *G06Q 50/01* (2013.01); *H04W 4/025* (2013.01)

(58) Field of Classification Search
USPC ........................................................ 707/748
See application file for complete search history.

(56) References Cited

U.S. PATENT DOCUMENTS

| | | | |
|---|---|---|---|
| 6,505,123 B1 | 1/2003 | Root et al. | |
| 6,587,740 B2 | 7/2003 | Byrne et al. | |
| 6,643,626 B1* | 11/2003 | Perri de Resende | G06Q 20/20 705/16 |
| 6,862,834 B2 | 3/2005 | Basch | |
| 7,173,197 B1* | 2/2007 | Kasperek | A01K 97/00 177/131 |
| 7,200,488 B2 | 4/2007 | Taboada | |
| 7,650,327 B2 | 1/2010 | Remsen et al. | |
| 7,818,190 B1 | 10/2010 | Sutherland | |
| 8,478,814 B2 | 7/2013 | Shafter | |
| 8,565,490 B2 | 10/2013 | Krien | |
| 9,195,370 B1 | 11/2015 | Hlatky, Jr. et al. | |
| 2002/0187723 A1* | 12/2002 | Abbas | A01M 31/004 446/202 |
| 2003/0036956 A1* | 2/2003 | Karas | G06Q 20/02 705/14.15 |
| 2003/0069896 A1 | 4/2003 | Byrne et al. | |
| 2003/0115215 A1 | 6/2003 | Swarovski | |
| 2004/0079019 A1* | 4/2004 | Basch | A01K 61/001 43/4.5 |
| 2004/0220856 A1 | 11/2004 | Moore | |
| 2004/0249860 A1 | 12/2004 | Stechschulte et al. | |
| 2005/0279007 A1* | 12/2005 | Trembone | A01K 85/01 43/17.6 |
| 2006/0002553 A1* | 1/2006 | Krien | G06T 7/602 380/245 |
| 2006/0085232 A1 | 4/2006 | Rice | |
| 2006/0095393 A1 | 5/2006 | Vinsant | |
| 2006/0111923 A1 | 5/2006 | Elslager | |
| 2007/0110281 A1 | 5/2007 | Jurk | |
| 2007/0188593 A1* | 8/2007 | Min | H04N 1/00307 348/14.01 |
| 2007/0220498 A1* | 9/2007 | Madsen | G06F 9/445 717/140 |
| 2007/0220798 A1 | 9/2007 | Davidson | |
| 2008/0046467 A1* | 2/2008 | Nakajima | G06F 12/1458 |
| 2008/0060210 A1 | 3/2008 | Trout et al. | |
| 2008/0140234 A1 | 6/2008 | Shafter | |
| 2008/0228515 A1 | 9/2008 | Tachikawa | |
| 2009/0177644 A1 | 7/2009 | Martinez et al. | |
| 2009/0210260 A1 | 8/2009 | Brown | |
| 2009/0248524 A1* | 10/2009 | Defoy | G06F 17/30893 705/14.1 |
| 2009/0313055 A1 | 12/2009 | Martin et al. | |
| 2010/0063829 A1 | 3/2010 | Dupray | |
| 2010/0331086 A1 | 12/2010 | Cuddeback | |
| 2011/0099612 A1 | 4/2011 | Lee et al. | |
| 2012/0000713 A1* | 1/2012 | Taboada | G01G 23/3728 177/1 |
| 2012/0144723 A1 | 6/2012 | Davidson | |
| 2012/0182180 A1* | 7/2012 | Wolf | G01S 5/021 342/357.29 |
| 2013/0274906 A1 | 10/2013 | Shafter | |

OTHER PUBLICATIONS

Green Mountain Digital, "Orvis Fly-Fishing Guide" iOS application, Apple iTunes Store, last viewed Aug. 28, 2013.
Green Mountain Digital, "FishBlue" iOS application, Apple iTunes Store, last viewed Jun. 10, 2013.
Green Mountain Digital, "Audubon Guides—A Field Guide to Birds, Mammals, Wildflowers, and Trees" iOS application, Apple iTunes, last viewed Aug. 27, 2013.
Nature Share web site available at http://www.natureshare.com/ (last visited Aug. 28, 2013).
Boone and Crockett Club web site available at http://www.boone-crocket.org/index.asp (last visited Aug. 28, 2013).
Boone and Crockett Club web site retrieved from archive.org (Apr. 28, 2012).
Businesswire, "Virginia Department of Game and Inland Fisheries Launches Android Version of Hunt Fish VA App", Feb. 13, 2012.
Field and Stream, Catchbook, retrieved from archive.org May 5, 2012.
ITunes App Store, Catchbook, retrieved from archive.org Apr. 1, 2012.
ITunes App Store, Fishing Spots by GeoTerrestrial, retrieved from archive.org Dec. 27, 2011.
Google search results from http://www.google.com/ using keywords "order trophy game animals," accessed May 8, 2015.
Google search results from http://www.google.com/ using keywords "category trophy game animals," accessed May 8, 2015.
Google search results from http://www.google.com/ using keywords "order customized trophy game animals," accessed May 13, 2015.

* cited by examiner

| | |
|---|---|
| TAXIDERMIST - PLEASE COMPLETE FORM | |
| NAME OF PERSON WHO HARVESTED BUCK | |
| JOHN DOE | |
| E-MAIL ADDRESS | |
| JOHN DOE@ EMAIL.COM | |
| PHONE NUMBER | |
| 16-555-0000 | |
| STATE DEER WAS HARVESTED | |
| STATE | |
| COUNTY DEER WAS HARVESTED | |
| COUNTY | |
| DATE HARVESTED | |
| 1/14/2012 | |
| TIME HARVESTED | |
| 7:30 | |
| RACK SIZE | |

| POINTS | WIDTH | HEIGHT |
|---|---|---|
| 8 | 21" | 17" |
| WEAPON USED | CHECK BOX THAT APPLIES | PROPERTY QUESTIONS |
| A) BOW | X | LAND FOR SCALE |
| B) GUN | | YES     NO |
| C) MUZZLE LOADER | | X |
| D) CROSS BOW | | LAND FOR LEASE |
| LOCATION KILLED | | YES     NO |
| A) GREEN FIELD | X | X |
| B) HARDWOODS | | |
| C) HAY FIELDS | | |
| D) RIDGE | | |
| E) ETC | | |
| DEER ATTRACTANT USED | | |
| BIG RACK DEER SCENTS | | |
| REAL DEER | | |
| C⁴ MERE DEER | X | |
| CODE BLUE | | |

FREE PREMIUM MEMBERSHIP TO:

TROPHYSTACK.COM
PLEASE ENTER ATTACHED CODE TO JOIN
AND RECEIVE INSTANT $100 REBATE FOR

"QUICK & EASY"
THEY ANSWER 7
BASIC QUESTIONS
AND CHECK 5
BOXES
LESS THAN 1 MINUTE TO COMPLETE

TROPHY STACK — 54

| | RANK | CAUGHT AT | LOCATION | | WEIGHT | LENGTH |
|---|---|---|---|---|---|---|
| PHOTO | #37 IN UNITED STATES<br>#34 IN ALABAMA<br>#11 IN BULL COUNTY | DECEMBER 16<br>2011 01:28 PM | BULLOCK<br>ALABAMA | 000.0 | 210.0 | 19.0 | 14.0 |
| PHOTO | #38 IN UNITED STATES<br>#35 IN ALABAMA<br>#12 IN JEFF. COUNTY | NOVEMBER 05<br>2011 04:17 PM | JEFFERSON<br>ALABAMA | 000.0 | 180.0 | 15.0 | 14.0 |

46

| | RANK | CAUGHT AT | LOCATION | WEIGHT | LENGTH |
|---|---|---|---|---|---|
| PHOTO | #1 IN UNITED STATES<br>#1 IN ALABAMA<br>#1 IN MONT. COUNTY | MARCH 05<br>2012 11:45 PM | MONTGOMERY<br>ALABAMA | 10.7 | 20.0 |
| PHOTO | #2 IN UNITED STATES<br>#2 IN ALABAMA<br>#2 IN MONT. COUNTY | MARCH 20<br>2012 10:45 PM | MONTGOMERY<br>ALABAMA | 10.3 | 20.0 |
| PHOTO | #3 IN UNITED STATES<br>#3 IN ALABAMA<br>#3 IN MONT. COUNTY | MARCH 31<br>2012 10:45 PM | MONTGOMERY<br>ALABAMA | 8.0 | 20.0 |

LOGIN OR REGISTER

ADVERTISING

Fig. 8

JOHN DOE - TROPHY ROOM

| | RANK | HARVESTED AT | LOCATION | SCORE | WEIGHT | RAKE WIDTH | RAKE HEIGHT |
|---|---|---|---|---|---|---|---|
| PHOTO | #1 IN UNITED STATES<br>#1 IN ALABAMA<br>#1 IN MONT. COUNTY | DECEMBER 05<br>2011 07:35 PM | JEFFERSON<br>ALABAMA | 000.0 | 200.0 | 16.0 | 14.0 |
| PHOTO | #2 IN UNITED STATES<br>#2 IN ALABAMA<br>#1 IN JEFF. COUNTY | DECEMBER 05<br>2011 02:35 PM | JEFFERSON<br>ALABAMA | 000.0 | 205.0 | 20.0 | 13.0 |
| PHOTO | #3 IN UNITED STATES<br>#3 IN ALABAMA<br>#1 IN BULL. COUNTY | JANUARY 04<br>2012 10:25 PM | BULLOCK<br>ALABAMA | 128.0 | 150.0 | 15.0 | 17.0 |
| PHOTO | #4 IN UNITED STATES<br>#4 IN ALABAMA<br>#2 IN BULL. COUNTY | DECEMBER 16<br>2010 04:08 PM | BULLOCK<br>ALABAMA | 000.0 | 200.0 | 20.0 | 09.0 |
| PHOTO | #5 IN UNITED STATES<br>#1 IN KANSAS<br>#1 IN BUTLER COUNTY | DECEMBER 16<br>2011 03:05 PM | BUTLER<br>KANSAS | 000.0 | 225.0 | 21.0 | 09.0 |

Fig. 9

METHOD OF RANKING AND DISPLAYING CERTIFIED CONTENT

CROSS REFERENCE TO RELATED APPLICATIONS

This U.S. Divisional Patent Application claims the benefit of CIP patent application Ser. No. 14/023,744 filed Sep. 11, 2013 which claims the benefit of U.S. patent application Ser. No. 13/896,960 filed May 17, 2013, which claims the benefit of U.S. Provisional Patent Application Ser. No. 61/648,253 filed May 17, 2012, U.S. Provisional Patent Application Ser. No. 61/678,833 filed Aug. 2, 2012 and U.S. Provisional Patent Application Ser. No. 61/692,886 filed Aug. 24, 2012. The entire disclosures of all applications being considered part of the disclosure of this application and hereby incorporated by reference.

BACKGROUND OF THE INVENTION

1. Field of the Invention

The subject invention provides a system and a method for generating a database of certified animal information, particularly trophy animals such as trophy game animals and then outputting information from the database to interested individuals, including providing a searchable database of relevant certified statistics regarding animals. Additionally, the subject invention provides a social media platform capable of allowing interested individuals to display and rank trophy animals.

2. Description of the Prior Art

Outdoor activities such as hunting and fishing account for a large sector of recreational spending around the globe. Americans spent an estimated 42 billion dollars on fishing related expenses and 22.9 billion dollars on hunting related expenses in 2011. Also in 2011, approximately 28 million Americans purchased fishing licenses and approximately 14.9 million Americans purchased hunting licenses. Every year many of these outdoor enthusiasts take to the field or water with the hope of taking a trophy game. Whether it is a 12 point white tail, a 10 pound largemouth bass, a drake canvasback duck, or any other animal, the taking of a trophy game represents a cherished highpoint for many outdoor enthusiasts and embodies their accomplishments as a hunter or fisherman. Similarly, bird watching, chasing, and sightings of rare or unique birds accounts for a significant amount of money each year.

Current bulletin boards, webpages, state record listings, and magazines fail to provide a convenient and modern way for outdoors enthusiasts to showcase and compare their trophy animal harvests, particularly with some measure of authenticity. Many trophy animal listings are unreliable and fail to provide certified or verifiable information, resulting in inconsistent and unbelievable data. Additionally, no service presently available offers a convenient process for displaying and certifying the authenticity of the trophy animal harvest over a period of time, for each individual outdoor enthusiast.

Other services, such as those offered by state game agencies, Boone and Crocket, and Buckmaster all require an extensive certification process that is burdensome for the hunter and the certifier alike. For example, in Michigan, a major deer hunting state, there are only three Buckmaster scorers. This means that a deer hunter in Michigan may have to drive long distances or many hours with their trophy game to have their trophy deer certified and placed on the Buckmaster website. Additionally, these services fail to present an easy to use user interface that allows an individual to quickly search and view the most relevant information.

Due to the current burdensome and inconvenient certification process, use of existing game animal certification services is limited, with only a small percentage of outdoorsmen providing verifiable information on trophy game harvests. These services also over-emphasize collection of physical data and fail to collect adequate information concerning the circumstances under which the trophy game was taken. In addition, few people enter each animal they kill during a season due to such burdensome requirements. The lack of outdoorsmen providing information to the services results in few entries from other outdoorsmen who may find the service to be unreliable or generally unused.

Due to the limited number of certified trophy game entries stored on such databases and inadequacies in the information collected, currently available services are not able to recognize meaningful trends in trophy game activity and movement. No service presently available to the relevant market is able to rank and output to the market trends in trophy game activity based on a variety of factors. Additionally, these services fail to present an easy to use user interface that allows an individual to quickly search and view the information that is most relevant to them.

In addition, few individuals enter each animal they harvest during a season due to such burdensome requirements and most individuals at most visit the sites only one to two times a year to view the rankings. Accordingly, the minimal traffic associated with these websites is extremely light, and is nonrecurring, thereby preventing them from functioning as a viable social media platform with which fellow outdoorsmen may interact in a virtual environment.

SUMMARY OF THE INVENTION

The present application provides a method of displaying and ranking content from an individual user against content from other users as well as a social media platform accessible by a user for displaying and ranking trophies taken by a plurality of users. The method includes the steps of prompting the individual user to input user-generated information; receiving the user-generated information; acquiring related information; receiving at least one visual recording related to the user-generated information; associating the user-generated information, the related information, and the captured visual recording to create a user single trophy entry in a remote database; ranking the user single trophy entry relative to a plurality of single trophy entries in the remote database to determine a relative rank; and displaying the user single trophy entry with the determined rank.

The user-generated information includes at least one of the size and quality measurements for an animal. For example, the size and quality measurements for a deer may include the weight, tip-to-tip spread, greatest spread, inside spread, and number of points. It should also be appreciated that the ranking of the plurality of single trophy entries and the user single trophy entry is by at least one of the size and the quality information.

The method may further include a step of accessing a mobile application having at least one of a picture module and a graphical user interface for uploading content to a database. The picture module may assist the user in the further step of capturing the visual recording of the animal. It should be appreciated that the visual recording may be a photograph, video, or any other visual rendering of the animal. The graphical user interface may assist the user in the further step of categorizing the content. It should be understood that the content may include any information relating to the animal, a trophy room, the user, or a certification partner, or any other information that may be included in the database.

The method may further include a step of accessing a network containing a plurality of certification partners. The certification partners may be, but are not limited to, taxidermists, hunting guides, charter captains, marina owners or staff. The method may additionally include the step of displaying business information concerning each of the plurality of certification partners in the network. It should be appreciated that displaying business information concerning each of the plurality of certification partners may further include a step of providing targeted advertising for each of the certification partners. Targeted advertising may include, but is not limited to, information relating to a service of a user, a certification partner, or any other party directed to other users, certification partners, or any other party.

The method may further include the step of categorizing the targeted advertising to be displayed. Categorizing the targeted advertising may include grouping the targeted advertising by type, intended audience, source, or any other desirable factor or factors. Additionally, the method may include a step of at least one of the user and the certification partner to select the targeted advertising to be displayed and/or a step of at least one of the user and the certification partner selecting a category of targeted advertising to be displayed. For example, a user may choose to have targeted advertising which displays only hunting related categories. Additionally, the may further include a step of at least one of the user and the certification partner excluding at least one category of targeted advertising from being displayed. For example, a certification partner engaging in a taxidermist business may exclude advertising for other taxidermists for pages on which the certification partner is displayed.

The method may further include a step of receiving certified user-generated information creating certified single trophy entries. Certified user-generated information may come from, for example, a certification partner. Additionally, the method may further include a step of offering a profit sharing incentive to the plurality of certification partners corresponding to the number of single certified trophy entries by each of the certification partners. The profit sharing incentive may, for example, provide a cash reward or any other reward or incentive to at least one of the plurality of certification partners based on many different factors.

The method may include a step of calculating the profit sharing incentive for each of the plurality of certification partners based on a percentage of annual profits generated from the remote database. Additionally, the profit sharing incentive may be based on the number of certified trophy entries certified by the certification partner, or any other desirable factor. The method may also include a step of calculating a profit sharing incentive which is larger for the certification partners certifying the single certified trophy entries with the highest size and quality measurements.

The method may further include a step of memorializing the user single trophy entry with a special icon. The special icon may indicate if the harvest was at least one of a first deer, a first fish, and a first harvest of a particular species harvested. Additionally, the method may include a step of memorializing the user single trophy entry with at least one of a virtual trophy and a virtual plaque indicating the size and quality measurements for the user single trophy entry. It should be appreciated that memorializing the user single trophy entry may include displaying sequentially the at least one of a virtual trophy and a virtual plaque based on the size and quality measurements.

The method may further include a step of displaying the user single trophy entry with the determined rank further and displaying the user single trophy entry in at least one of a user trophy room and a certification partner trophy room. If the certification partner uploads the single trophy entry to the certification partner trophy room, the user trophy room may automatically be created by the database for the user and the single trophy entry displayed in the user trophy room. Stated another way, the method may further include a step of automatically creating the user trophy room when at least one of the plurality of certification partner communicates the single certified trophy entry to the remote database. Additionally, the user may be automatically notified of the user trophy room creation and what may be displayed thereon.

The method may further include a step of communicating at least one of the user-generated information, the related information, and the captured visual recording to an agency for logging into an agency database. The agency may include, for example, a state government, a federal government, a wildlife department or game agency, the coast guard, or any other governmental or non-governmental agency engaging in wildlife or outdoor management or record keeping. Additionally, the method may include a step of receiving a communication from the agency. The communication may be, for example, hunting, fishing, or weather conditions, as well as information relating to the opening or closing of a hunting or fishing season, or game reports.

The method may further include a step of verifying the single trophy entry. Additionally, the method may include a step of associating the user-generated information, the related information, and the captured visual recording to create a verified user single trophy entry in the remote database. A verified user single trophy entry may be used when the harvest cannot be conveniently transported to a certification partner for certification, or when the individual user is engaging in a hunt-and-release of catch-and-release practice.

The method may further include a step of ranking a plurality of certification partners. Additionally, the method may include a step of displaying the certification partner with the determined rank. Certification partners may be ranked based on many different factors, including number of certified trophy entries, size and quality of certified trophy entries, successful charter fishing or hunts, and these factors may also be broken down by time. For example, the best charter boat captain for catching sail fish in the month of May in the Gulf of Mexico may be determined by ranking the above factors and utilized by an outdoorsman accessing the ranking feature.

The method may further include a step of acquiring the user generated information further includes a step of comparing the user generated information between at least two tournaments in which the individual user participates to create a comparison link between the at least two tournaments. The method may additionally include a step of displaying at least one of the comparison link between the at least two tournaments, a trophy from different tournaments, and a rank from a different tournament to the individual user. It should be appreciated that tournaments are an event, and the method may encompass any event. For example, the comparison link may display a link between a bass fishing tournament, a hog hunting tournament, and a marathon. Additionally, the method may further include a step of ranking the tournaments and displaying the determined rank for the tournaments. This may, for example, display in the trophy room of the user how the user has performed in prior tournaments or events.

The method may further include a step of acquiring contact information for users and automatically generating a manifest in the database. A vessel captain may be required to generate a manifest prior to taking individuals out on the vessel, and may additionally be required to file the manifest with an agency such as the coast guard. The method may include a step of acquiring the contact information for the users on the vessel by prompting the user to enter their contact information to create the manifest on behalf of the vessel captain. Additionally, the method may include a step of automatically filing the manifest with the appropriate agency, which may eliminate the need for the vessel captain to manually create the manifest and/or manually file the manifest with the agency.

The social media platform includes a database containing a plurality of trophy entries uploaded by the plurality of users, each including user input information and a visual recording of the trophy entry; a ranking module having executable instructions for ranking said plurality of trophy entries stored in a database into a list of ranked trophy entries; and an output module having executable instructions for outputting said ranked trophy entries and said list of ranked trophy entries to a social media user interface and wherein said social media user interface includes a user page presenting said list of ranked trophy entries.

The social media user interface may include a user trophy room for each of the plurality of users populated with the trophy entries uploaded by the user. Additionally, the trophy room may display all trophy entries uploaded by the user according to predetermined criteria. Such criteria may include various ranking schemes, geographic location, size and quality measurements, or any other factor or factors the user may desire. The social media platform may also associate the trophy entries presented in the trophy room with the visual recording and at least a portion of the input information. Therefore, the trophy room may display any or all of the picture or video of the trophy entry along with information such as a name, a location, a size and/or quality measurement, or any other information the user may enter or choose to have displayed.

The social media platform may also be configured to automatically display the trophy entries in at least one of the user trophy room and a certification partner trophy room when the trophy entries are communicated to said database. If the certification partner uploads the single trophy entry to the certification partner trophy room, the database of the social media platform may automatically create the user trophy room for the user and the user trophy room may then display single trophy entry. Additionally, the social media platform may be configured to automatically notify the user when a trophy entry is communicated to the database that the user harvested or was otherwise involved in the harvest of.

It should be appreciated that the social media platform may contain many elements, including input information. Input information may additionally include at least one of a location data, a physical data, an equipment data, a user identity data, and a time data. The location data may include at least one of a country, a state, a county, and an elevation. Elevation may include the user's height relative to the ground when the trophy entry is at least one of observed and captured. The physical data may include at least one of a species identification, a size measurement, and a quality characteristic. The equipment data may include at least one of a weapon, a bait, an attractant, a camera, a lens, a film, a light sensitivity, an aperture, a tackle type, a lure type, a type of line, a type of rod, a type of reel, a type of bait, a fish attractant used, name of a guide service, the name of a lodge, name of a camp, and name of a facility used.

The social media platform may additionally be configured to automatically acquire overlay data based at least one of the time data and the location data. Overlay data may include one of a pressure, a precipitation, a moon phase, a temperature, a wind chill, a heat index, a sunset time, and a sunrise time. Overlay data may be displayed in the user trophy room or the certification partner trophy room, or may additionally be included in a ranking scheme which may assist the user in determining the best time, location, or weather in which to hunt a particular species.

The ranking module may have executable instructions for ranking the trophy animal entries stored in the database. Additionally, the ranking module may rank by comparing at least a portion of the physical data of each trophy entry to generate a list of ranked trophy entries. The social media user interface may display the list of ranked trophy entries and the visual recording and at least a portion of the input information for each trophy entries presented on the list of ranked trophy entries. A user may view the list of ranked entries alone or may elect to have additional information, such as input information, overlay data, or a picture, displayed along with the list. This may assist the user in determining times and/or locations to hunt, or in determining who has harvested the best animals in an area.

The output module may further include a communication module for alerting users when another user harvests a trophy entry. Additionally, the output module may out output the ranked trophy entries and the list of ranked trophy entries to an external social media platform. The external social media platform may take the form of a presently known source, such as Twitter® or Facebook®. Additionally, the social media platform may be a social media platform not yet available or in any form of medium, such as online, through a mobile application, or any other form of communicating information.

The output module may also have executable instructions for outputting the input information to an agency for logging into an agency database. The agency may include, for example, a state government, a federal government, a wildlife department or game agency, the coast guard, or any other governmental or non-governmental agency engaging in wildlife or outdoor management or record keeping. Additionally, the social media platform may receive a communication from the agency. The communication may be, for example, hunting, fishing, or weather conditions, as well as information relating to the opening or closing of a hunting or fishing season, or game reports.

The social media platform may further include a witness application. The witness application may be configured to operate on a mobile device. Additionally, the witness application may further include a graphical user interface displaying user engageable content on the mobile device. Engaging the witness application may display at least one of a first harvest screen comprising a picture module for capturing a visual recording and a second harvest screen for entering size and quality measurements for the trophy game harvest. The second harvest screen may include at least one of an overlay data module for retrieving time data and location data and a communication module for establishing a connection between the mobile device and the database.

The social media platform may be configured to include a manifest feature. The manifest feature may acquire contact information for at least one of the plurality of users. Additionally, the manifest feature may automatically generate a manifest. A vessel captain may be required to generate a manifest prior to taking individuals out on the vessel, and may additionally be required to file the manifest with an agency such as the coast guard. The manifest feature may acquire the contact information for the users on the vessel by prompting the user to enter their contact information to create the manifest on behalf of the vessel captain. Additionally, the manifest feature may automatically file the manifest with the appropriate agency. Automatic filing of the manifest by the manifest feature may eliminate the need for the vessel captain to manually create the manifest and/or manually file the manifest with the agency.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 5 is a screenshot illustrating an exemplary electronic form used for collecting user-generated information in accordance with an aspect of the subject invention.

FIG. 8 is a screenshot illustrating an exemplary webpage for searching and accessing the database generated in accordance with an aspect of the subject invention.

FIG. 9 is a screenshot illustrating an exemplary webpage showing the certified trophy animal entries taken and uploaded by a single individual in a trophy room in accordance with an aspect of the subject invention.

DETAILED DESCRIPTION OF THE ENABLING EMBODIMENTS

Referring to the Figures, wherein like numerals indicate corresponding parts throughout the several views, a method 20 for displaying and ranking content from an individual user against content from other users is provided. Also, a method 20 as described above including additional steps for certifying trophy information, such as trophy game animal information, through a network containing a plurality of certification partners is provided. Finally, a social media platform for displaying and ranking trophies taken by a plurality of users 60 is provided.

Figure 1:
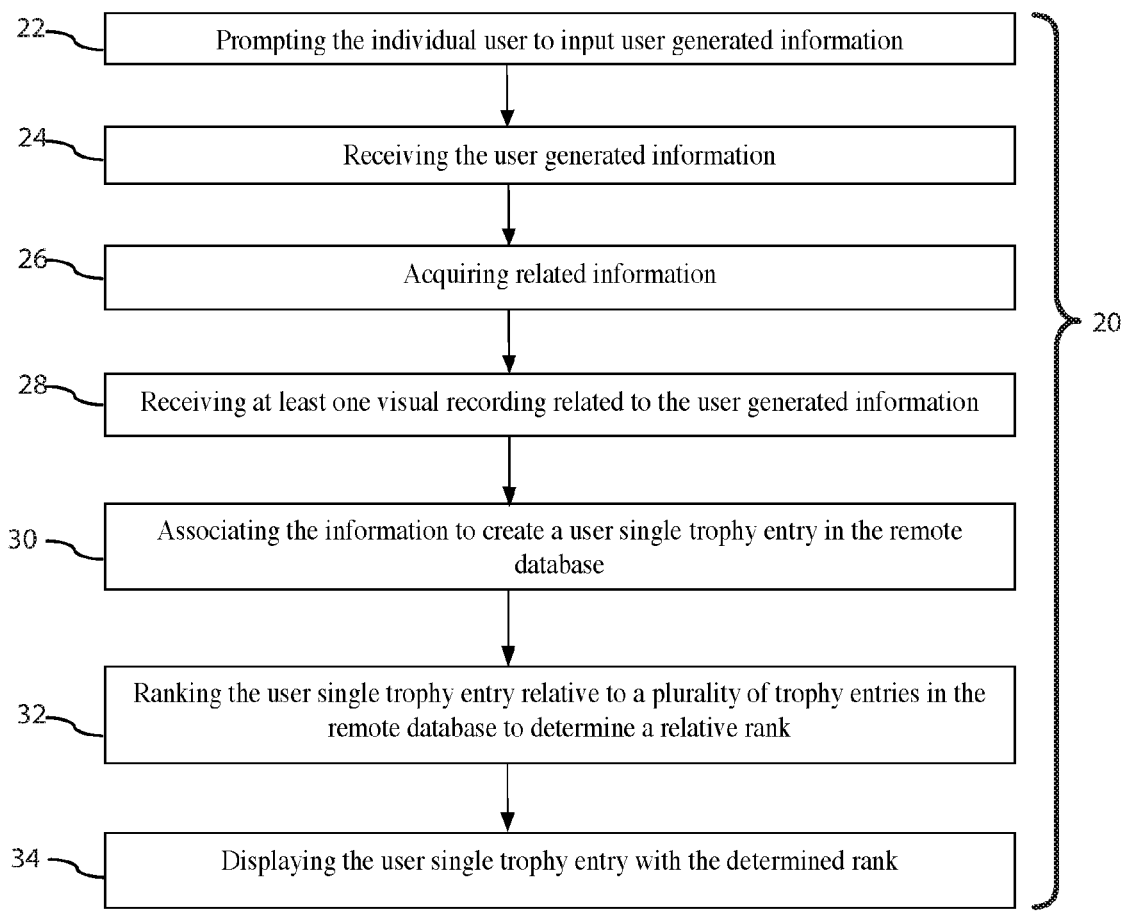
FIG. 1 is a block diagram flow chart illustrating the method for displaying and ranking content from one user against content from other users.

Referring to FIG. 1, the method 20 for displaying and ranking content from an individual user against content from other users requires a step of prompting 22 the individual user to input user-generated information. The method 20 receives 24 the user-generated information, acquires 26 related information, and receives 28 at least one visual recording related to the user-generated information. The method 20 associates 30 the user-generated information, the related information, the captured visual recording, and any other desired information and media to create a user single trophy entry in a remote database 62. The method 20 uses any received associated user-generated information, related information, and captured visual recording in a user single trophy entry and the ranks 32 the user single entry relative to a plurality of single trophy entries in the remote database 62 based on a selected criteria to determine a relative rank. Once the user single trophy entry is ranked 32 the method 20 may display 34 the user single trophy entry with the determined rank.

Figure 2:
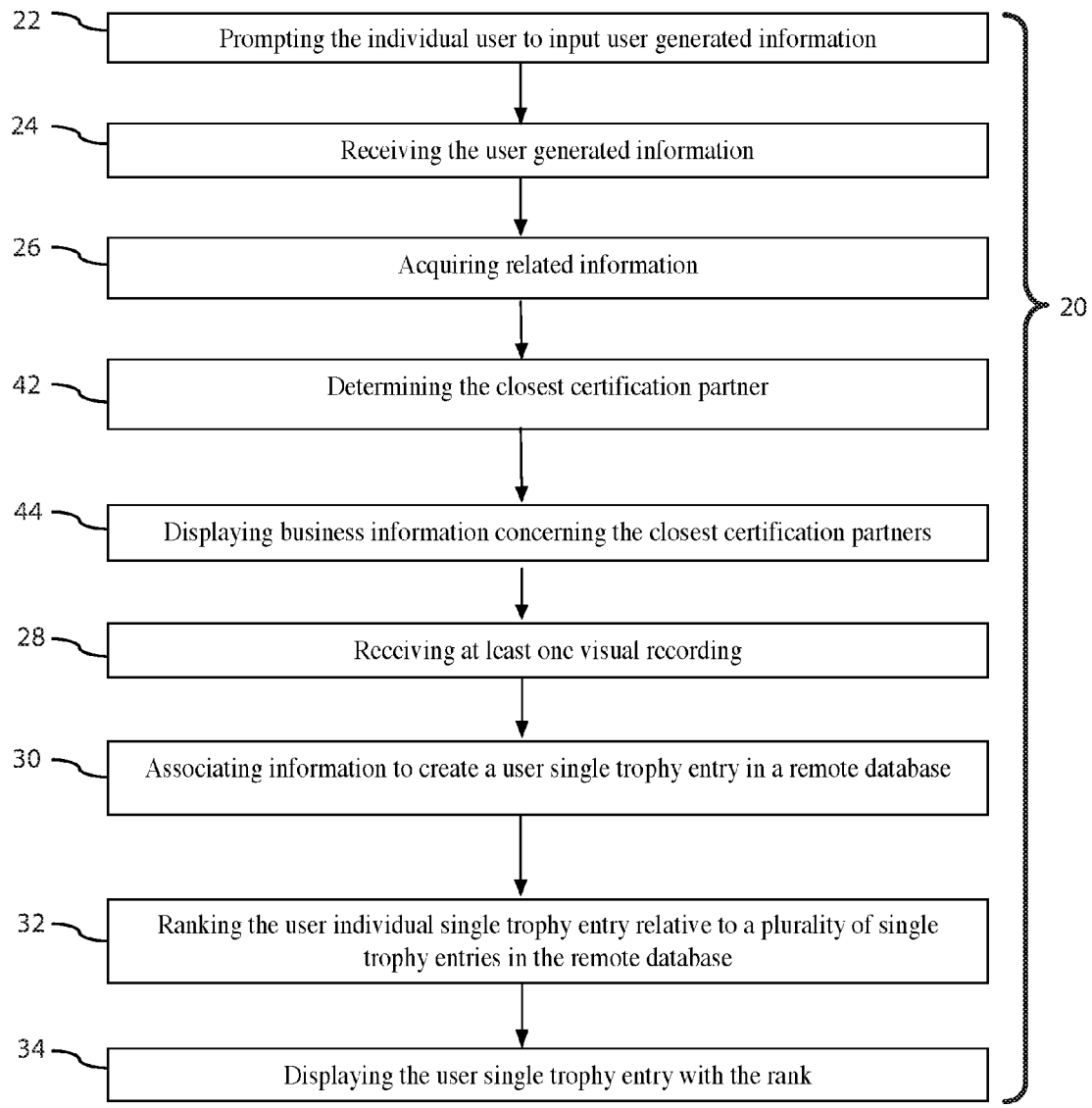
FIG. 2 is a block diagram flow chart illustrating the method of certifying trophy game information through a network containing a plurality of certification partners.

As illustrated in FIG. 2, the method 20 may perform additional steps relating to certifying the user single trophy entry. The method 20 performs the steps of prompting 22 the individual user to input user-generated information, receives 24 the user-generated information, and acquires 26 related information. The method 20 may also determine 42 the closest certification partner from the plurality of certification partners and display 44 the business information 50 concerning the closest certification partners. The method 20 will also receive 28 at least one visual recording related to the user-generated information and associate 30 the user-generated information, the related information, and the captured visual recording as, well as any other desired information, to create a user single trophy entry in a remote database 62. The method 20 uses the associated user-generated information, the related information, and the captured visual recording which created a user single trophy entry to rank 32 the user single entry relative to a plurality of single trophy entries in the remote database 62 to determine a relative rank. The method 20 then displays 34 the user single trophy entry with the determined rank and such display may be individually or with selected single trophy entries.

Figure 4:
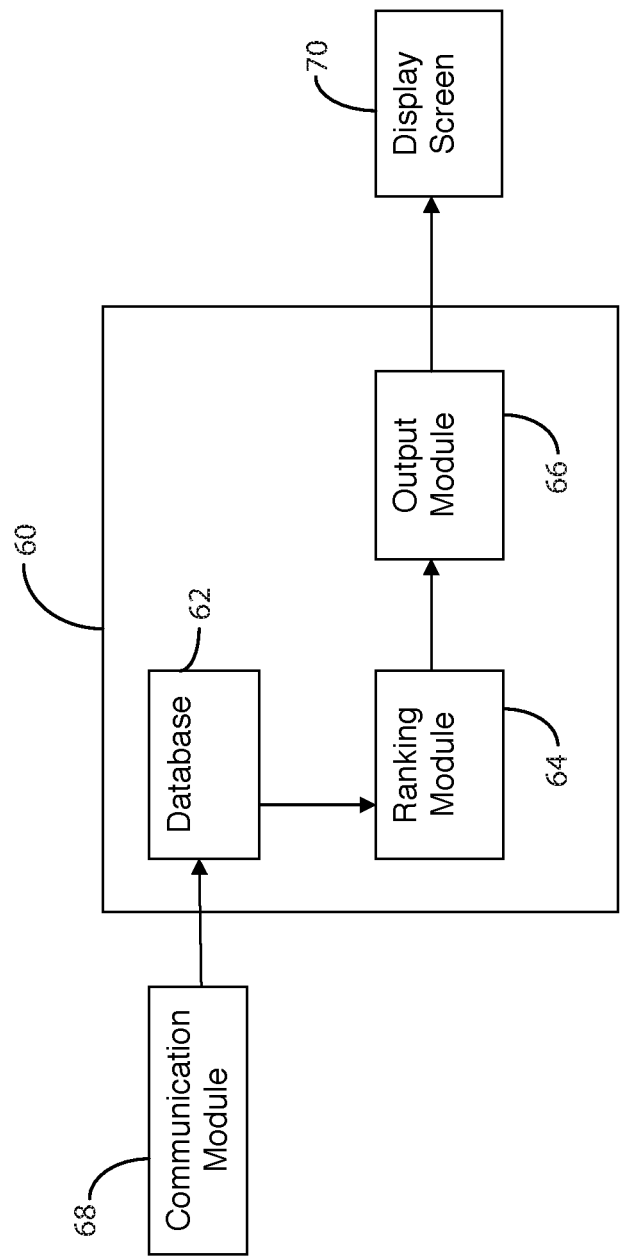
FIG. 4 is a block diagram showing the social media platform for displaying and ranking trophies taken by a plurality of users.

Referring to FIG. 4, the social media platform 60 for displaying and ranking trophies taken by a plurality of users includes a database 62 containing a plurality of trophy entries uploaded by the plurality of users. Each trophy entry is expected to include user input information and a visual recording of the trophy entry. The social media platform 60 for ranking and displaying trophies taken by a plurality of users also includes a ranking module 64 having executable instructions for ranking the plurality of trophy entries stored in a database 62 into a list of ranked trophy entries. The list of ranked entries may be displayed by users who have not uploaded any or any relative trophy entries. Then, the social media platform 60 for ranking and displaying trophies taken by a plurality of users may include an output module 66 having executable instructions for outputting the ranked trophy entries and the list of ranked trophy entries to a social media user interface. The social media user interface 60 may include a user page 54 presenting the list of ranked trophy entries, and the list may include and identify any trophy entries uploaded by that user.

As used in this application, the term "trophy game harvest" refers to a game animal or trophy game taken by a user or by an outdoorsman. The term "outdoorsman," as it is used herein, is not meant to be gender specific and may refer to both men and women. In accordance with this method, the trophy game may be from a wide range of animal species generally targeted by outdoorsmen. It should be appreciated that the outdoorsman may be a hunter or a fisherman. The term "taken," as it is used herein, is meant to cover catching, capturing, trapping, or dispatching the trophy game. In some circumstances, capturing may be defined as capturing the animal in some tangible medium other than physically capturing the animal such as in a picture or video recording. Accordingly, the term "taken" is not limited to animals killed as taken animals, such as fish or other trapped animal. For example, for bird watchers, capturing a picture may be sufficient to qualify as taken. It additionally encompasses animals which may be kept alive and returned to the wild after photographing and recordation of the physical data. It should also be appreciated that user-generated information may also be referred to as input information or user input information. Finally, it should be appreciated that trophy game, trophy entry, and trophy game harvest may be used interchangeably.

Referring to FIG. 1, the method 20 for displaying and ranking content from an individual user against content from other users first requires the step of prompting 22 the individual user to input user-generated information. The individual user may be prompted in several ways. These include, but are not limited to, prompting through a website to enter the user-generated information via an electronic form 52 or prompting the individual user through a mobile application to enter the user-generated information. The user may be the person taking the animal or, in some instances, the user may be substituted with a certification partner as described more detail below. As such, a certification partner may receive the prompt 22 and enter the user-generated information as provided to them by a user. A screenshot illustrating an exemplary electronic form 52 used for collecting the user-generated information may be seen in FIG. 5.

As illustrated in FIG. 1, the method may receive 24 user-generated information, in accordance with the disclosed method 20 in response to the previous prompt 22. The user-generated information may broadly include outdoorsman identity data, equipment data, and physical data. The outdoorsman identity data may include a name of the outdoorsman, that is, the user, who harvested or took the trophy game, an e-mail address for the outdoorsman, a phone number for the outdoorsman, age, gender, number years engaging in the activity, such as hunting, or any other desirable information. The equipment data may include equipment used by the outdoorsman to take the trophy game and any desired information regarding that equipment. For example, equipment data may list the weapon used to take the trophy game, any bait, if used, or any attractant, including the brand of attractant. Equipment data concerning the weapon used to take the trophy game may additionally include general classifications, depending on the type of activity or sport. For example, for hunting the equipment may be broken into general classifications such as firearm, trap, crossbow, or bow. In the case of a firearm, the equipment data may more specifically list the type of firearm as well as the manufacturer, model, caliber of the weapon, type of ammunition used, and any other relevant information such as choke tubes for a shotgun. Alternatively, where the trophy game is a fish, the equipment data may include tackle, lure, type of line, line test, rod and reel information. The equipment information could also be type, make, and model of camera as well as the lens and the conditions such as shutter speed and aperture. Of course, for other activities and animals, the equipment may vary and likewise the desired input may vary for what is desired information. The equipment data may further include the name of a guide service, lodge, camp, or other facility used by the outdoorsman as well as other types of ancillary services.

The physical data collected varies depending on the species of the trophy game harvested or taken by the outdoorsman, as well as the method of taking. The physical data generally identifies the species of game animal taken and quantifies size and/or quality characteristics of the trophy game. For example, where the trophy game is a deer, the physical data may include weight and rack information. The rack information may include number of points, overall width as measured at the widest segment of the rack, and overall height as measured at the tallest segment of the rack. Where the trophy game is a fish, the physical data may include weight and overall length information. Where the trophy game is a wild turkey, the physical data may include weight, length of beard, and length of spur information. Where the trophy game is another game bird, the physical data may include weight and wingspan information. Of course, if the method of taking is photography, providing weight would not be possible, as well as other characteristics available as the result of fishing, hunting, and trapping. Therefore, it should be appreciated that the examples of physical data given above are exemplary and are not limiting. The method 20 disclosed herein may be applied to animal species other than those listed above and any other data relevant to the characteristics of that animal taken may be collected as physical data.

In the step of acquiring 26 related information, in accordance with the disclosed method 20, the related information may broadly include time data and location data, as well as other desired information. The time data includes a time at which the trophy game was taken and may specify date, hour, minute, and second information corresponding to the time the trophy game was taken.

The location data includes a location at which the trophy game was taken and may specify country and state and county information corresponding to the location where the trophy game was taken. While the method could request Global Positioning System (GPS) data and/or longitudinal and latitudinal positioning, it is expected that many hunters and anglers will not desire to provide specific locations to their secret spots. The location data may further include information concerning the property or land on which the trophy game was taken such as elevation or geological information. For example, the location data may include the topography of the area where the trophy game was taken. The topography information may include whether the area was forested, a field, a hillside, a valley, or more specifically, whether the area was green field, hardwoods, hayfield, ridge, or the like. In addition, the location data may include position data of the outdoorsman, such as if the trophy game was taken from the ground or a tree stand and the height of the tree stand. Where the trophy game is a fish, the location data may alternatively include the name of the body of water where the fish was taken such as GPS coordinates, lake name, river name, ocean name, bay name, pond name, stream name, water surface conditions at the time, estimated clarity of the water and the like. The topography information may further include elevation, proximity to water, and natural food sources. The topography information may also include, especially when the trophy game is a fish, water body characteristics such as water temperature, clarity, weed growth, bottom depth, depth of fish caught, baitfish, bottom composition, and submerged structure including points, drop-offs, tree trunks, pilings, stream beds, weeds, and the like. The location data may also include information indicating whether the land or property on which the trophy game was taken is for sale or for lease or other desirable information, including whether the land is publicly accessible.

The method 20 may further include, as illustrated in FIG. 1, the step of receiving 28 at least one visual recording related to the user-generated information. The visual recording may take the form of a photograph or a video of the trophy game. The person taking the animal, or in some circumstances, a certification partner or professional photographer, may take the visual recording. The visual recording may also be used as a measure of verification wherein the trophy game may be certified in addition or in place of the certification partners by viewing the visual recording. For example, a fish may be certified by viewing a visual recording showing the fish being weighed on a scale or measured with a ruler. The system may provide the means of taking an acceptable picture, such as an application on a mobile phone.

The method 20, as illustrated in FIG. 1, also includes the step of associating 30 the user-generated information, the related information, and the captured visual recording to create a single trophy entry in a remote database 62. The single trophy entry combines the user-generated information, the related information, and the visual recording of the trophy game in the form of data as a discrete package of information. Accordingly, each single trophy entry stored on the database 62 forms part of the plurality of trophy entries which the next single trophy entry may be ranked against. The single trophy entry may be accessed and a display screen may be presented showing the user-generated information, the visual recording of the trophy game, and any overlay data. In this manner, the outdoorsman can access and view their own trophy game entries as well as the trophy game entries of fellow outdoorsmen, such as by animal species, year, location, and any other desirable characteristic.

With the data entered by the user, such as a certification partner or an outdoorsman, as described above, the method 20 may then rank 32 the user single trophy entry relative to a plurality of single trophy entries in the remote database 62 to determine a relative rank. Of course, as more entries are added, this rank may change. More specifically, the method 20, as illustrated in FIG. 1, may include the step of ranking the physical data of the single trophy entry against other physical data of other single trophy entries stored in the database 62.

As a result of the comparison, the method 20 may include the step of ranking the single trophy entry relative to the other trophy entries stored in the database 62. Accordingly, multiple ranking schemes may be executed. For example, the method 20 disclosed may stack rank the heaviest deer of all time, comparing the weight information contained in the single trophy game entry against all trophy entries of deer stored in the database 62 that include weight. Alternatively, the method 20 may stack rank the heaviest deer taken by customized time inputs, such as today, this week, this month, or this year, or any other given time period by comparing the weight information contained in all single trophy game entries for deer taken within the relevant time period.

It should be appreciated that the method 20 may also rank the trophy game entries by any of the physical data criteria entered. The stack ranking may even limit the ranking to a specific geographic location such as by county or by equipment used or a combination of inputs, or to an area within a location, such as a trophy entries harvested within a completely fenced-in area, a high fence area, a low fence area, or free range. For example, the method may stack rank all trophy deer taken by bow in a particular state last year. Accordingly, every outdoorsman can have their fifteen minutes of fame and can ascertain useful information in the form of stack rankings as the method 20 accommodates narrow ranking schemes restricted by specific equipment data, location data, time data entries, and other desirable characteristics, that allow their trophy entry to be ranked highly.

The method 20 may also rank 32 other criteria to identify statistical trends. The method 20 may compare trophy game entries based on location data. For example, the method 20 may rank 32 the most productive counties or states for trophy deer hunting by comparing those producing the highest number of trophy deer entries in the past year. For instance, the method 20 may stack rank 32 the ten best counties in the United States for taking a trophy white tailed deer. As another example, the method 20 may rank 32 the most productive bodies of water for trophy bass fishing by comparing those producing the highest number of trophy bass entries in the past five years. For instance, the method 20 may stack rank 32 the best five lakes in Florida for catching trophy largemouth bass. Similarly, the method 20 may rank 32 the most productive guide services, lodges, camps, charter boats, or other facilities or services used by outdoorsmen. In this way, the method 20 disclosed provides an answer to the often asked question of "where do I stand the best chance of taking particular a trophy game?"

Additionally, the method 20 may rank the trophy rooms of a plurality of users to generate a list of ranked trophy rooms. The ranking of the trophy rooms may be based on any number of desirable criteria such as the number of trophy animal entries presented in the trophy rooms or the number of different species of trophy animals presented in the trophy rooms. Accordingly, the trophy room of a user may be ranked compared to the trophy rooms of other users based on the total number of trophy animal entries presented in the trophy room.

Alternatively, the ranking may be based on the number of animal entries presented in the trophy room for a particular species of animal. For example, trophy rooms may be ranked based on the number of trophy deer entries presented. The trophy rooms may also be ranked based on the number of different species of animal accounted for by trophy entries presented in the trophy room. For example, trophy rooms may be ranked based on the number of different waterfowl species represented by the trophy entries presented in the trophy room. In this manner, a user may be recognized for the variety of trophy animals presented in their trophy room. Additionally, the trophy room may be ranked based on the type of content presented and displayed within the trophy room. For example, a trophy room may display, as well as rank and display the rank, fish and animals harvested by the outdoorsman, as well as ranking and displaying other events the outdoorsman has participated in. Such events may include, but are not limited to, fishing tournaments, hunting tournaments, marathons or other running tournaments or competitions, triathlons, kayak racing, swimming meets, archery competitions, or any other fitness or non-fitness based tournament, event, competition, or sport.

Additionally, the method 20 may rank businesses of interest to an outdoorsman, particularly certification partners that are boat captains, charter fisherman, marina owners, hunting guides, fishing guides, taxidermists, meat processors, or other partners working with outdoorsman in any field. The method 20 may rank these certification partners based on a number of different factors. Examples of ranking factors may include, but are not limited to, ranking based on time, outdoorsman success, quality of services, the number of uploaded certified trophy entries, location, or any other number of factors. Rankings based on time may include, for example, ranking certification partners for any period of time, including daily rankings, weekly rankings, monthly rankings, yearly rankings, all-time rankings, or ranking during any specific season.

Rankings based on outdoorsmen success, for example, may include ranking certification partners by the number of certified trophy game harvests taken while outdoorsmen are with the certification partner. Outdoorsmen may harvest trophy game with a certification partner while on a guided hunt or a charter fishing experience. It should be noted that guided hunts and charter fishing experiences are non-limiting examples of ways an outdoorsman may interact with, and therefore factor into the rankings for the certification partner. Rankings based on the number of uploaded certified trophy entries may include, for example, providing a rank to certification partners using the frequency of certified trophy game entries uploaded or the total number of certified trophy game harvests uploaded during any period of time, as discussed above for rankings based on time. Rankings based on location may utilize a specific tract of land, a general area, a forest such as a private or state forest, a city, a county, a state, or a country.

When the certification partner returns with the outdoorsman from the guided hunt or charter fishing experience, the certification partner may record physical data for all certified trophy games harvests and capture a visual recording of the largest or highest quality trophy game harvested and the overall trophy game harvested. These visual recordings and physical data may be uploaded into the trophy room of the certification partner and the trophy room of the outdoorsman for inclusion in the rankings of the outdoorsman. Additionally, and as discussed above, the uploaded data for the certified trophy game harvest may be used to stack rank the certification partner against other certification partners.

For example, boat captains may be ranked by the total number of fish and the largest fish harvested by outdoorsmen on their boats over any period of time, such as a day, a week, a summer, a fishing season, a year, or all time or by any other ranking scheme discussed above, including average fish per trip and other statistical factors to adjust for outliers in any dataset. As another example, a hunting guide may be ranked based on the total number of deer harvested and the largest deer harvested by outdoorsmen based on any ranking scheme discussed above. Ranking certification partners based on relevant results may aid outdoorsmen in choosing the certification partner best suiting their needs. For example, an outdoorsman seeking a hunting guide for November deer hunt in Shelby County, Alabama may rank hunting guides by time and location. The outdoorsman may then browse rankings for the highest rated hunting guides meeting the outdoorsman's specific criteria, particularly for that month in that location.

The method 20 may further include, as illustrated in FIG. 1, the step of displaying 34 the user single trophy entry with the determined rank. Additionally, the user single trophy entry could further be displayed against the ranks of other users' single trophy entries.

Figure 3:
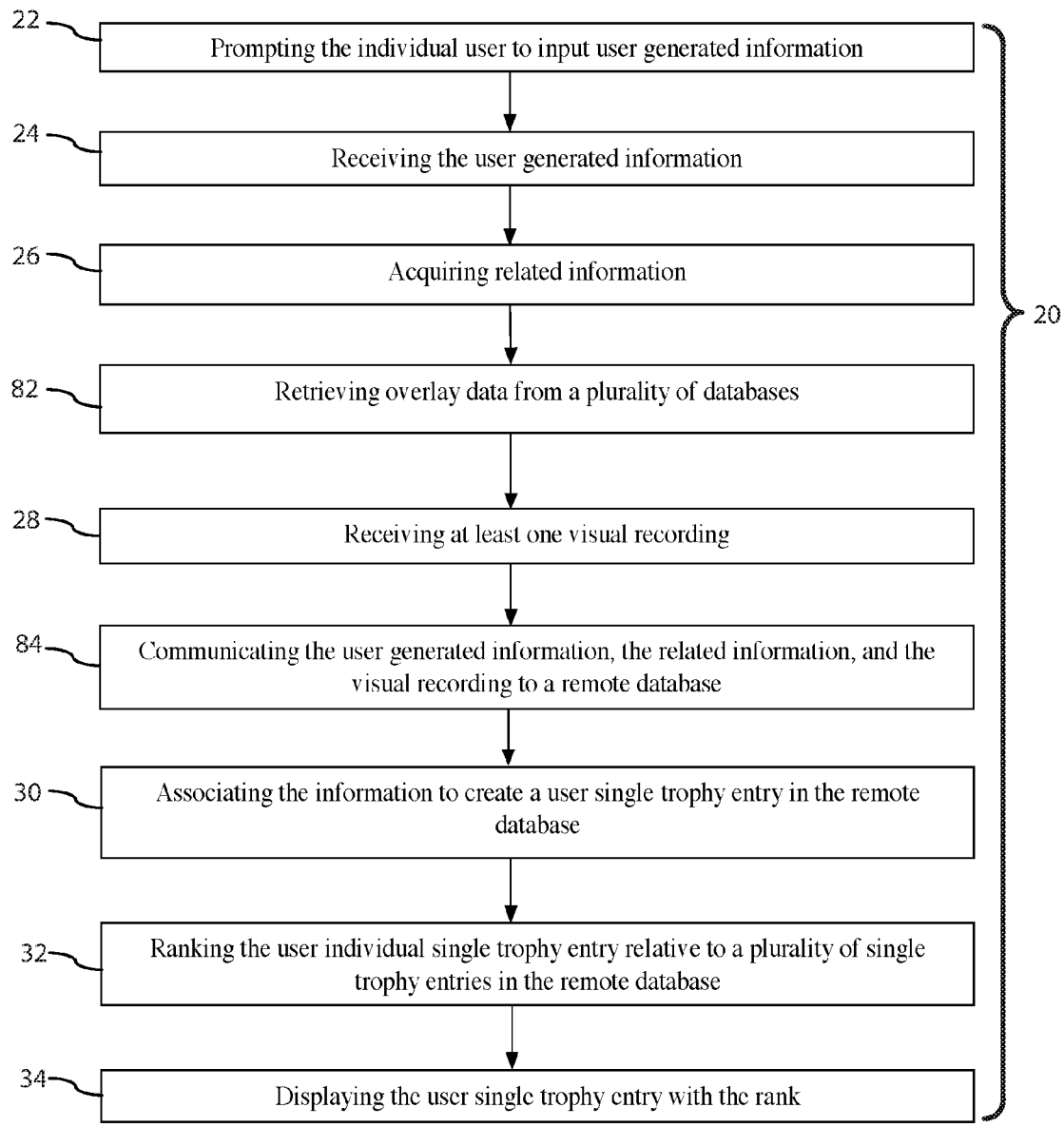
FIG. 3 is a block diagram flow chart illustrating the method of displaying and ranking content from user against content from other users including retrieving overlay data and communicating with the database.

As illustrated in FIG. 3, the method 20 may also include the step of retrieving overlay data 82 from a plurality of databases in response to collecting the time data and the location data. More specifically, the step of retrieving overlay data 82 may include retrieving a variety of environmental information based upon the provided time and location data of the trophy game harvest. For example, environmental data including weather and moon phase information may be retrieved from other databases based upon the time and location data collected. Accordingly, when the method 20 collects the time and location data of a trophy animal harvest, the overlay data such as the weather information and moon phase information corresponding to that trophy animal harvest may be automatically retrieved.

The overlay data 82 may include a wide variety of other environmental information such as barometric pressure, temperature, humidity, sunrise time, sunset time, wind chill, heat index, load cover, and recent precipitation. By automatically retrieving the overlay data 82, less input information is required of the outdoorsman, by simplifying and shortening the process of data gathering and entry for the outdoorsman. Furthermore, the overlay data 82 including the environmental information has been found to be useful in determining influences on the activity level and movements of game animals. The present invention uses the overlay data to determine, a more complete picture of statistical trends in game animal activity level and movements and as such can predict the best times in geographic areas to hunt. In addition, it should be appreciated that the outdoorsman identity data, including a name or contact information for the outdoorsman, may automatically be retrieved from the memory storage unit of the mobile device if the memory storage device contains this information. Effectively, if the outdoorsman is utilizing a mobile device, the outdoorsman may only be required to capture a visual recording with the mobile device and enter physical data for the trophy game harvest. The mobile device may automatically retrieve the remaining information, including overlay data and outdoorsman identity data, and upload the trophy game harvest to the database 62.

As illustrated in FIG. 3, the method 20 may also include the step of communicating 84 the user-generated information, the related information, and the captured visual recording to a database 62 having a plurality of single trophy entries. The communication of the user-generated information, the related information, and the captured visual recording may take the form of a discrete package of information.

FIG. 2 is representative of a method further including steps for certifying trophy animal information through a network containing a plurality of certification partners 20.

This method follows the initial steps laid out in the method of displaying and ranking content from an individual user against content from other users 20. Initially, the method 20 described herein comprises many of the steps disclosed in detail above, such as prompting 22 the individual user to input user-generated information, receiving 24 the user-generated information, and acquiring 26 related information. Additionally, the method 20, determines 42 the closest certification partners or partner from a plurality of certification partners in the remote database 62.

The closest certification partners are determined based on user-generated information, and more particularly, from the location data entered by the individual user. The remote database 62 determines 42 the closest certification partners or partner based on business information 50 stored in the remote database 62 for the plurality of certification partners. The business information 50 includes contact information for the plurality of certification partners and services provided by the plurality of certification partners if applicable. Contact information includes, but is not limited to, street address, city, state, and zip code information, phone number, email address, or a web address. Services provided may include, but is not limited to, the type of business the plurality of certification partners are engaged in. By way of example, this could include taxidermy services, meat processing services, hunting guide services, fishing guide services, marinas, bait shops, or boat charter services. The system may limit visible certification partners, such as a marina would not show up as a certification partner for hunting even it was the closest.

As illustrated in FIG. 2, the method 20 may display 44 the business information concerning the closest certification partners. This may be seen in FIG. 6, which depicts a screenshot illustrating an exemplary webpage 54 showing business information 50 concerning a certification partner in accordance with an aspect of the subject method 20. Any or all of the information related to the location and/or services offered by the certification partners or partner may be displayed 44 in this manner. It, of course, may be desirable to display to the user multiple certification partners.

As illustrated in FIG. 2, the method 20 may include the step of receiving 28 at least one visual recording related to the user-generated information which may occur before or after displaying 44 the business information 50 of the closest certified trophy partners. Once the visual recording is obtained 28, the method 20 may take the associated user-generated information, the related information, and the captured visual recording all of which form a user single trophy entry and the ranks 32 the user single entry relative to a plurality of single trophy entries in the remote database 62 to determine a relative rank 32. The method 20 may display 34 the user single trophy entry with the determined rank, individually or against other trophy entries, as discussed above in greater detail.

As discussed above and as illustrated above, method 20 may include the step of collecting and receiving the user-generated information and the visual recording of the trophy game. These steps may be performed by one of the certification partners, the outdoorsman, or each may perform parts of the steps that when complete allow the single trophy entry to be considered a certified single trophy entry. The certification partner may inspect and measure the trophy game and may provide some or all of the physical data.

The method 20 may proceed with the step of uploading the certified trophy entry automatically and in some instances, in real time to the database 62 in response to collecting and receiving the user-generated from one of the certification partners. Additionally, the database 62 may automatically notify the outdoorsman that their certified trophy entry has been uploaded using contact information supplied by the outdoorsman. All or part of the user-generated information and the visual recording included in the certified trophy entry may be supplied by the certification partner. Accordingly, the process is simple and easy for the outdoorsman wherein the outdoorsman is required to provide only small portion of the input information. For example, the outdoorsman may provide only location and type of animal or activity wherein the method and system then display closest certification partners and upon arriving at the certification partner, all of the user information may be provided.

Figure 7:
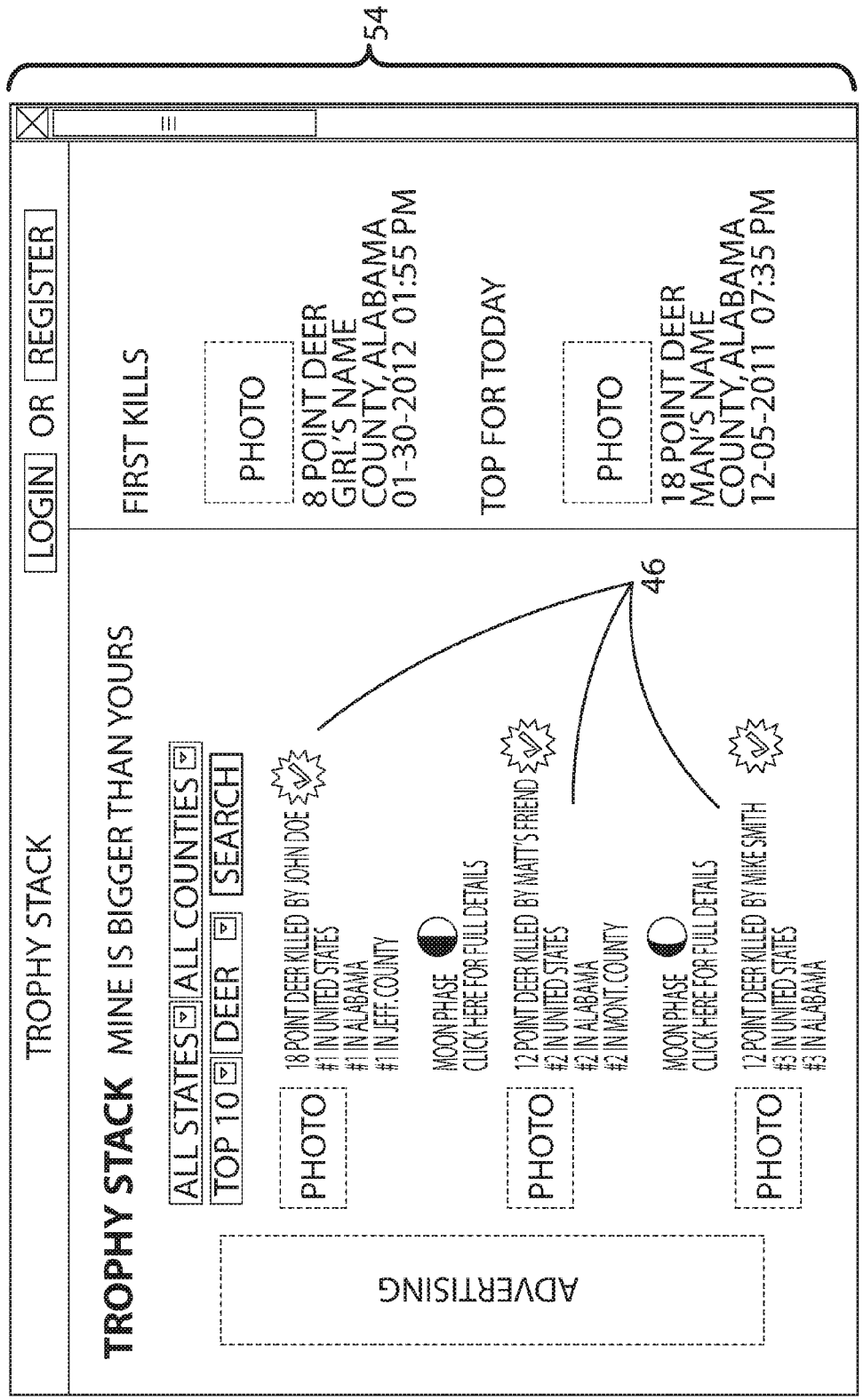
FIG. 7 is a screenshot illustrating an exemplary webpage for searching and accessing the database generated in accordance with an aspect of the subject invention.

All or a portion of this electronic form 52 may be completed by the certification partner. In response to uploading the electronic form 52, the certified trophy entry is stored on the database 62. The database 62 may be accessed on a webpage 54 where interested individuals can search for and view the certified trophy entries. FIGS. 7 and 8 are screenshots showing exemplary webpages 54 illustrating a plurality of certified trophy entries 46 ranked in accordance with the method 20 presented above.

Figure 6:
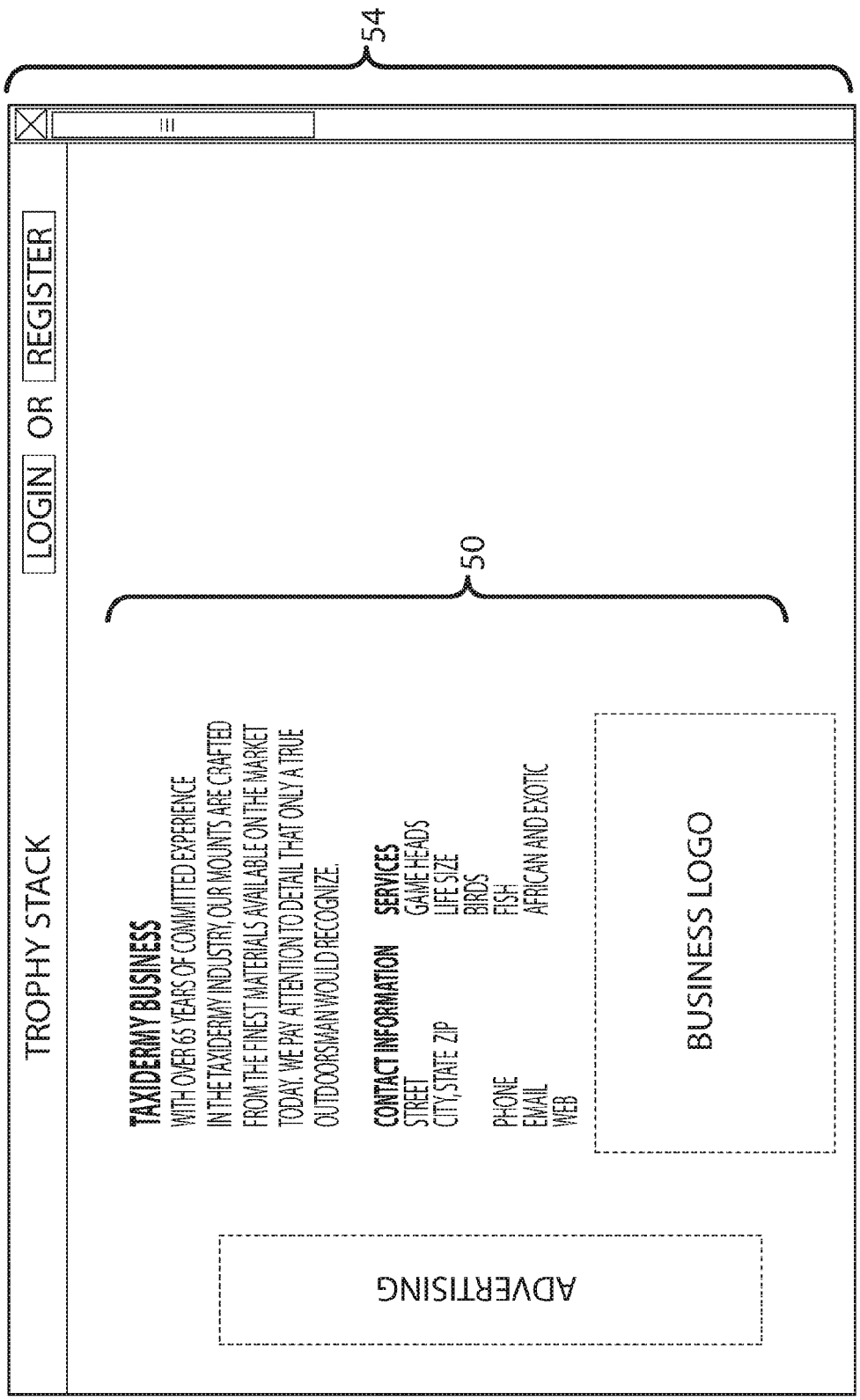
FIG. 6 is a screenshot illustrating an exemplary webpage showing information concerning a certification partner in accordance with an aspect of the subject invention.
Figure 10:
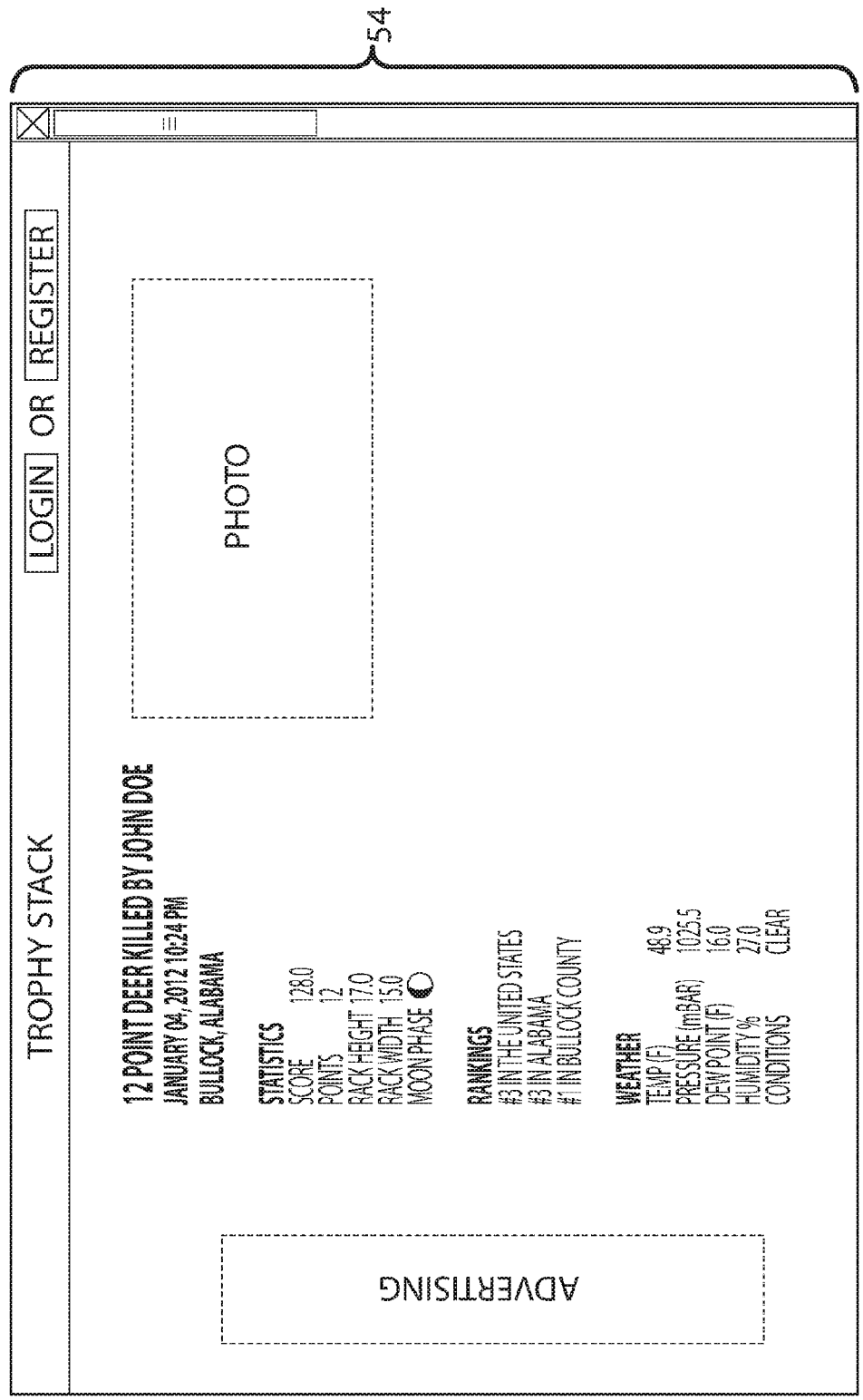
FIG. 10 is a screenshot illustrating an exemplary webpage showing a single certified trophy animal entry uploaded to the database in accordance with an aspect of the subject invention.
Figure 11:
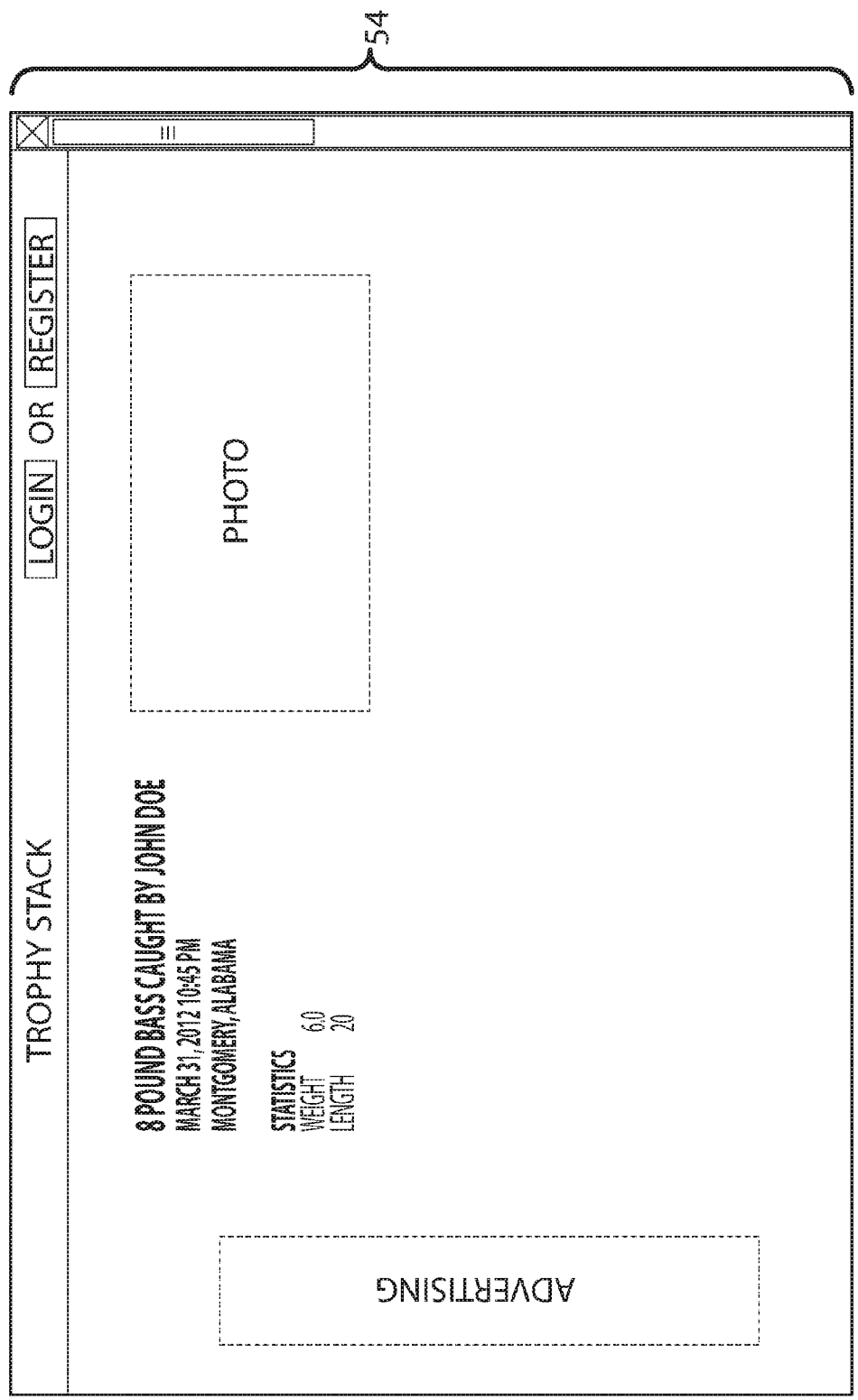
FIG. 11 is a screenshot illustrating an exemplary webpage showing a single certified trophy animal entry uploaded to the database in accordance with an aspect of the subject invention.

The webpage 54 may further include a trophy room showcasing the trophy game entries uploaded by a single individual. Accordingly, this trophy room may include trophy game entries from a plurality of years, locations, and game animal species. FIG. 9 is a screenshot illustrating an exemplary webpage 54 showing the certified trophy entries taken and uploaded by a single individual in a trophy room 48. FIGS. 10 and 11 are screenshots illustrating exemplary webpages 54 showing a single certified trophy entry uploaded to the database 62 in accordance with the method 20 disclosed above. The webpage 54 may include all or a portion of the user-generated information, overlay data, and the visual recording associated with the single certified trophy entry. Referring to FIG. 6, and as discussed above, the webpage 54 may further include business information 50 concerning each of the certification partners in the network.

If certification through a certification partner is not available when an outdoorsman makes a trophy game harvest, the outdoorsman may take the trophy animal to a witness to be verified and uploaded to the database 62 or identified as a verified trophy game entry. A witness may be an individual registered to access the database 62, and certain restrictions or qualifications may be required. Verification may be used any time it is not feasible to see a certification partner, such as when transporting the trophy game harvest is difficult to due to distance to a certification partner, timing, or inability to transport the trophy game harvest, or if the trophy game harvest will be released, or any other similar circumstances that would limit or make it difficult to obtain certification through a certification partner. It should be appreciated that throughout this application, the terms 'verification' and 'witness' may be used interchangeably. For example, if it is stated that a user may have their trophy game harvest 'verified' or having undergone 'verification', this should be read the same as having the trophy game harvest 'witnessed'.

The verified trophy game harvest may then be associated with the user generated information, the related information, and the captured visual recording to create a verified user single trophy entry in the database 62. By way of example, verification will add credibility to catch-and-release fishing or tranquilize-and-release hunting because any harvest may be photographed and verified by a third party witness. Additionally, more than one outdoorsman may witness a harvest. Two or more witnesses may verify the harvest, thereby providing even more credibility for the harvest. Additionally, if size and quality measurements cannot be taken for the harvest, an estimate feature may allow the outdoorsman or witnesses to estimate the size and quality measurements for the harvest. If the harvest generates multiple estimates, the method 20 may average the value of the estimates. This may work, for example, in catch-and-release fishing with a scale, or when targeting large fish that are generally not brought into the boat if the fish is to be released, such as a sail fish or a marlin.

When an outdoorsman makes a trophy game harvest, the outdoorsman may take the trophy animal to one of the certification partners to be certified and uploaded to the database 62 or identified as a certified trophy game entry. Accordingly, the network of certification partners will provide points of contact through which the outdoorsman may access and upload certified game animal entries to the database 62. Additionally, if a certified trophy game entry is uploaded to the database 62 by the certification partner on behalf of the outdoorsman, the certified trophy may automatically and immediately upload to at least one of the trophy room of the certification partner and the trophy room of the outdoorsman.

If the outdoorsman does not have a trophy room already created, a trophy room may automatically be generated for the outdoorsman when a certification partner uploads the certified trophy game entry to the database 62. Additionally, if a certification partner uploads any certified trophy game entry to either the certification partner's trophy room or the outdoorsman's trophy room, a communication, such as an e-mail, may be automatically delivered the outdoorsman.

Active participation by the network certification partners is highly desirable as the involvement of the certification partners helps generate a database 62 of verified information rather than one full of sensational claims. To ensure participation of the certification partners, the method 20 may further include the step of offering a profit sharing incentive to the plurality of certification partners. The profit sharing incentive may correspond to a predetermined number of certified trophy entries uploaded by each of the certification partners.

According to the incentive structure of the disclosed method 20, a higher number of certified trophy entries correspond to a higher profit sharing incentive for that certification partner. For example, the following profit sharing incentive structure may be used to encourage participation. The annual profits generated from the database 62 may include a percentage set aside to be disbursed to the network of certification partners. This percentage may equal any percentage or amount of the annual profits generated from the database 62 to be split between the network of certification partners.

All profits disbursed to individual certification partners may be based on a profit per partner figure equaling the percentage or amount set aside for profit sharing divided by the total number of certification partners. The percentage or portion of the profits per partner disbursed to a particular certification partner may be based upon the number of certified trophy entries uploaded by that certification partner during a fixed time period. Additionally, there may be a minimum upload requirement wherein a certification partner will not be eligible to participate in profit sharing without exceeding this threshold number of certified trophy entries. The minimum upload requirement may also vary depending on the species of game animal certified and uploaded to the database.

By way of example, the profit sharing incentive may operate according to the following methodology. Where a certification partner uploads less than seventy-five certified trophy entries annually, that certification partner may be excluded from participating in profit sharing. Where a certification partner uploads seventy five to one hundred and ninety-nine certified trophy entries annually, that certification partner will be entitled to sixty percent of the profits per partner figure that year. Where a certification partner uploads two hundred to two hundred and ninety-nine certified animal entries annually, that certification partner will be entitled to seventy percent of the profits per partner figure that year. Where a certification partner uploads three hundred to three hundred and ninety-nine certified trophy entries annually, that certification partner will be entitled to eighty percent of the profits per partner figure that year. Where a certification partner uploads four hundred to four hundred and ninety-nine certified trophy entries annually, that certification partner will be entitled to ninety percent of the profits per partner figure that year. Finally, where a certification partner uploads five hundred or more certified trophy entries annually, that certification partner will be entitled to one hundred percent of the profits per partner figure that year. Accordingly, a certification partner may receive a larger percentage of the profits per partner figure when that certification partner uploads a greater number of certified trophy entries in the given year.

Additionally, the profit sharing incentive may correspond to the highest number of ranked certified trophy entries or the largest certified trophy entries overall or the largest certified trophy entries for each class of trophy entry over a predetermined period of time or in a predetermined geographical location, or both. The predetermined period of time may be a day, a week, a month, a year, the length of the allowable harvest season, or any other period of time. The predetermined geographical location may be a county, a state, a region of a country, or a country. For example, the certification partner that submits the largest deer in the state of Alabama in a given calendar year may receive a greater profit sharing incentive than other certification partners. The profit sharing incentive may also be structured to incentivize certification partners to participate in certifying trophy entries in geographical areas having a low number of certification partners, a low ratio of certification partners to outdoorsmen, or no partners within the geographical area.

The method 20 may provide an additional incentive to certification partners to enter geographical areas or drive greater distances to service outdoorsmen who have less access to certification partners. For example, a certification partner providing certification services to a geographical area with no other certification partners, or a very low ratio of certification partners to outdoorsmen, may receive a larger profit sharing incentive than a certification partner in a geographic region containing a high number of certification partners or higher ratio of certification partners to outdoorsmen. It should be appreciated that the numbers set forth in this paragraph are only presented as an example to further explain the details and structure of the profit sharing incentive.

It should also be appreciated that beyond profit sharing, there is an incentive to attract customers and to be displayed in the database 62. This incentive may include free targeted advertising in the form of display of business information on the webpage. Additionally, the advertising may be specifically targeted to outdoorsman who may be interested in the particular services of the certification partner. It should be noted that targeted advertising as used herein encompasses and includes the terms free targeted advertising, free advertising, permanent advertising and value added advertising. Additionally, advertising as used herein may additionally encompass future developed technology advertising, including advertising through mobile devices, mobile applications, or any other form of future developed advertising. By way of example, a certification partner who is a taxidermist may advertise directly to outdoorsman engaged in the harvest of trophy game animals. Or a certification partner who is a charter captain may advertise directly to outdoorsman most likely to engage in charter fishing trips.

Additionally, the advertising may be categorized into various lists or types of advertisement. For example, categories may include, but are not limited to, taxidermists, gun makers, charter captains or other fishing services, outfitters, hunting guides, or any other category desired. The user and/or the certification partner may then select the advertising that is displayed to them when they access the database or that is displayed for them when others access the database. The user or the certification partner may choose from a list of advertising that which is displayed or the user or certification partner may choose which categories of advertisement is displayed. For example, a user interested in taxidermists and hunting guide services may elect to receive only advertisements falling into the categories of taxidermists and hunting guide services. Additionally, this process may work by allowing the user or the certification partner to exclude advertisement either using the list of advertising or by excluding at least one specific category or by ranking. For example, a certification partner who is a charter boat captain may elect to exclude advertisements from other charter boat captains on pages the certification partner is portrayed on. Or a user may elect to exclude all advertisements relating to fishing if the user prefers not to have fishing related advertisements displayed. The user may also elect to exclude all advertisements for certification partners of any category with a low ranking or a ranking below a pre-determined threshold. It should be understood that the above are merely examples of several of the uses of the selection and exclusion of advertising and should not be considered limiting.

Increased visibility of the certification partner through advertising in the rankings and trophy rooms of outdoorsmen may increase the likelihood of an outdoorsman booking a trip with, or otherwise purchasing the services of, the certification partner. By way of example, an outdoorsman interested in catching largemouth bass may browse the trophy rooms of other outdoorsman to see their largemouth bass as certified trophy entries. The outdoorsman may find advertisements for a charter captain who is consistently certifying the highest ranking largemouth bass and thereby utilize the webpage to contact the charter captain to purchase a fishing trip. Additionally, when an outdoorsman searches for a certification partner to certify a trophy game harvest, the rankings will provide advertising for the certification partner. The outdoorsman may then decide to purchase additional services from the certification partner after having the trophy game harvest certified. For example, an outdoorsman searching for a certification partner to certify a trophy game harvest may additionally purchase the taxidermists services.

The certification partners also have an incentive to improve their rankings to improve the visibility of their advertising. An outdoorsman may choose to select a very successful certification partner and utilize the rankings and advertising in the rankings to do so. A certification partner may therefore improve their rank by certifying more trophies. By certifying a larger number of trophies and improving their rankings, the certification partner may earn more business from customers seeking highly ranked certification partners. Therefore, free advertising may differentiate a certification partner from other like businesses and provide additional business for the certification partner.

It should also be appreciated that the incentive may include additional value added or permanent advertising by memorializing accomplishments. When a certification partner certifies a trophy game harvest, the certification partner may indicate in the database 62 that the outdoorsman has achieved a certain accomplishment. The accomplishment, which will be discussed in greater detail below, may automatically be entered in the trophy room of the outdoorsman. The accomplishment may include the business information of the certification partner, thereby providing additional advertising for the certification partner, such as when others view the trophy room of that outdoorsman or the harvested animal. Different accomplishments may include, but are not limited to, 'first fish', 'biggest fish', 'first deer', 'first buck', or the outdoorsman's first time taking a specific species, or the largest or a given species, taken by the outdoorsman. By way of example, if an outdoorsman harvested their first deer, the certification partner may indicate the accomplishment by selecting 'first deer' and 'biggest deer' for the outdoorsman.

The accomplishment may automatically upload to the trophy room of the certification partner, the outdoorsman, or both, with the accomplishment containing the business information for the certification partner. As discussed above, the accomplishment may provide free, permanent, and value added advertising for the certification partner as long as the accomplishment is retained in the trophy room of the outdoorsman. Additionally, the certification partner's trophy room may link directly or indirectly to a web site or other platform, or provide other contact information, wherein the outdoorsman may purchase the services of the certification partner. Therefore, a certification partner uploading more certified trophy harvests and the largest certified trophy harvests may have high rankings, making the certification partner more visible to outdoorsman. It should also be appreciated that the method 20 may aid state governments, federal governments, or other wildlife agencies, both public and private, in tracking wildlife herds for various species, accurately counting harvests to aid in monitoring population, and aiding in the assessment of harvest regulations. It should be noted that the term agency as used herein may include state governments and their various departments and agencies, federal governments and their various departments and agencies, or any other wildlife agencies. Additionally, any of these terms may be used interchangeably.

To accomplish these goals at present, many states, for example, require certain game harvests be recorded in the state's harvest system, such as Tennessee and Minnesota with regards to deer harvesting. Other states strongly urge certain game harvests be recorded to aid the state in determining size, health, and distribution of the game species, such as Michigan with regards to deer harvesting. This may include species of land based game, as well as different species of fish. When an outdoorsman makes a trophy game harvest, the outdoorsman generally must take the trophy game harvest to a check station, which may be a state entity or a private contractor.

An aspect of the webpage 54 may therefore provide a feature to automatically upload the trophy game animal to a state harvest database 62, thereby eliminating the need for the outdoorsman to transport the trophy game harvest to a check station for inspection and recordation. This feature may increase the number of registrations in states where registration of certain game animal is mandatory as well as recommended, thereby providing more accurate data for the state. The outdoorsman could still take the trophy game harvest to a certification partner to become a certified trophy game entry or take the trophy game harvest to a witness to become a verified trophy game entry, as discussed above. Additionally, the database 62 may provide real-time updating for any outdoorsman registered.

A state agency may require individuals desiring to purchase a permit to hunt or fish a restricted species, such as wolves or bears, to connect to the database 62. The state agency may then automatically intake harvest information as it is uploaded by the outdoorsman, as well as providing real-time updates to the outdoorsman. Updates from the state agency may include information relating to the length of the season, weather conditions, largest harvests of the season, or information relating to the harvest limited being achieved, or that the particular restricted species season is closed. The state is therefore aided by receiving accurate and up-to-date information from the outdoorsman and the outdoorsman is benefited by receiving accurate and up-to-date information from the state agency.

The method 20 may also provide a tournament feature for outdoorsman interested in participating in sporting tournaments or events. Tournaments as used herein may include fishing competitions, hunting competitions, or other competitions including, but not limited to, running, dog-sledding, biking, kayaking, canoeing, mud racing, sailing, archery, shooting, or any other competition an outdoorsman may be involved in. Additionally, it should be appreciated that the terms tournament and events may be used interchangeably. The tournament feature may assist in ranking or linking events which are not competitive in nature, and therefore, the term event should be seen to encompass the term tournament. While the tournament feature may be used for tournaments in many competitive disciplines, it should be appreciated the following descriptions for the tournament feature will primarily use fishing tournaments by way of example. However, it should be understood that the fishing tournaments are being used in an exemplary, and not a limiting, manner.

The tournament feature may link together various tournaments in which an outdoorsman has competed in the trophy room of the outdoorsman. So long as information is uploaded to the database 62 the results may be displayed in the trophy room of a participating outdoorsman. If the information is uploaded by a certification partner or a tournament coordinator, the results may be certified when displayed in the outdoorsman's trophy room. Additionally, the tournament feature may rank tournaments, based on final placement or other factors, and provide public recognition to the outdoorsman by displaying the rank in the outdoorsman's trophy room. Ranking factors may include largest fish caught in a single tournament, overall number of fish caught in all or a portion of the tournaments competed in, average tournament finish for all or a portion of tournaments competed in, or finish in the most recent tournaments.

The rankings may also include captured images from the tournaments, including captured images of all fish caught in each tournament and the largest fish caught in each tournament. In addition, the tournament feature may automatically associate the outdoorsman's fish with a particular team utilizing the contact information for the outdoorsman. This permits the tournament feature to stack rank outdoorsman or the outdoorsman's team by species of fish or size of fish, or any other previously discussed ranking scheme, automatically.

The tournament feature may also display various information for the tournament on the webpage 54. The information displayed may include the location of the tournament, including the state, county, tract of land or lake at which the tournament will take place; the meeting or starting place of the tournament, including any landmark or business a competitor should locate prior to the tournament; the status of the tournament, including whether registration is open or closed. The tournament feature may also display sponsor information for any of the tournament's sponsors; tournament information, including any information the competitors should know as well as displaying the marks of the tournament organizers, if applicable; registration information, allowing competitors to sign up for a tournament; and displaying prices for members and non-members, prizes for all places, dates, fees, boat fees for members and non-members, lodging information for the tournament, and any other information relating to the tournament the tournament organizers would like to display to competitors or non-competitors.

The tournament feature may organize and rank past, present, and future tournaments the outdoorsman has participated in or may participate in by many varying factors. Organization and ranking factors may include type of tournament, such as fishing tournaments, hogging tournaments, turkey tournaments, and marathon running tournaments; broad categories of tournaments, such as salt water fishing, fresh water fishing, or deer hunting; more narrow subcategories of tournaments, such as blue water fishing, off-shore fishing, shallow water fishing; or by species of trophy animal sought, such as bass fishing, whitetail hunting, or Osceola turkey hunting.

The tournament feature may additionally rank by narrow categories within the tournament. Examples of the narrow ranking may include, but are not limited to, largest fish caught for each team, largest fish caught for each boat, largest fish caught overall, most fish caught for each team, most fish caught for each boat, or most fish caught overall. The rankings may then be broken down by any of the various categories, which are discussed at length above, and linked to a tournament scoreboard 160. Scoreboards and other scoring displays presently being used during tournaments break the rankings into brackets based on either age of the outdoorsman or species of trophy game harvest. The tournament scoreboard 160, as shown in FIG. 20, may display one or more captured visual images of the trophy game harvest, the outdoorsman's overall rank, the outdoorsman's team's rank, the outdoorsman's rank within their own team, and the size and quality measures for at least one of the outdoorsman's trophy game harvests for the tournament.

Figure 20:
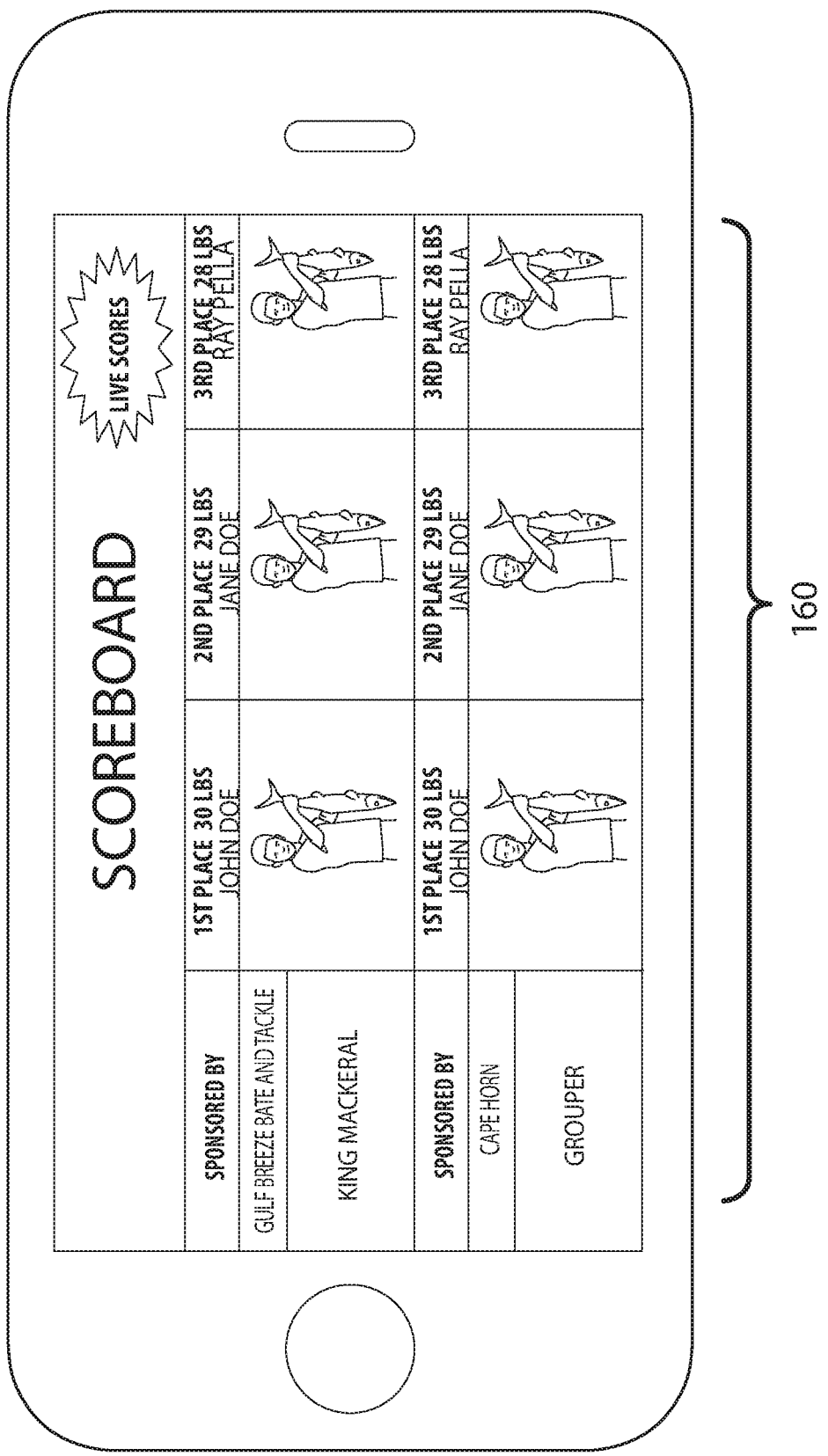
FIG. 20 is a screenshot illustrating a tournament scoreboard in an exemplary mobile application.

As displayed in FIG. 20, the tournament scoreboard 160 may additionally be further broken down into brackets or subcategories and ranked based on age of the outdoorsman, species of trophy harvest, length outdoorsman has competed in similar tournaments, equipment type, weather conditions, daily harvest, or any other number of various subcategories for cataloguing information. The tournament scoreboard 160 may also be linked to the trophy room of the outdoorsman's team or the outdoorsman, or to other tournament scoreboards 160 to generate long-term statistics for the outdoorsman, including overall finishes and average finishes in individual tournaments over time.

The tournament feature may be activated when a tournament host agrees to register the tournament in the database 62. Participating outdoorsman may then also register with the database 62, if the outdoorsman has not already done so. The database 62 may determine if an outdoorsman has already registered using the outdoorsman contact information. The participating outdoorsman may be assigned a tournament trophy room for the tournament. The tournament trophy room may be a separate trophy room for each tournament, a single trophy room for all tournaments participated in, or the outdoorsman's trophy room as discussed above.

The results of the tournament and any statistics, awards, prizes, captured images, and trophy harvest weights and/or scores may be associated with the outdoorsman and their trophy room and their tournament trophy room(s), if applicable. The outdoorsman's trophy room and/or tournament trophy room may also display a virtual plaque which certifies the outdoorsman's final tournament ranking along with any applicable captured image of the outdoorsman. The captured image may be of the outdoorsman along, with all or part of their team, or with any or all of their trophy game harvest.

The virtual plaque may certify and memorialize the accomplishment of competing in the tournament, or series of tournaments, as well as the ranking of the outdoorsman in individual tournaments or a collection of tournaments. The virtual plaque may also certify and memorialize team results or be displayed in a team trophy room, which may then link to each member of the teams individual trophy room. Virtual trophies may be awarded by achieving certain pre-determining accomplishments. Additionally, trophy rooms for winners of virtual trophies may be displayed sequentially to show off which users took the largest certified or uncertified trophy entries for the specific area and for different times.

Qualifying accomplishments for a virtual trophy may include harvesting one of the largest certified or uncertified trophy entries for a specific area, which may be local, county wide, state wide, regional, or nationwide, or for a specific time, which may be a day, a week, a month, a rifle season, a bow season, a game fish season, a calendar year, or any other period of time, whether harvested as part of a tournament or during the normal harvest season for the specific game species.

The tournament feature may provide benefits to participating outdoorsman as well as tournament hosts. Participating outdoorsman may have the event memorialized in the form of a virtual plaque; the accomplishment may be displayed in the outdoorsman's trophy room and/or linked to other team member's trophy rooms and/or the tournament's trophy room. Additionally, the participating outdoorsman will gain exposure, through the trophy room of acquaintances or team members, to other tournaments. By way of example, an outdoorsman who regularly competes in fishing tournaments may find a local hunting tournament that they were previously unaware of and choose to participate.

The tournament feature additionally provides the opportunity for every competitor in a tournament to automatically win a prize at the end of a pre-determined period of time, such as a season or a calendar year. Greater participation by the outdoorsman in tournaments and greater use of the tournament feature may result in an increased chance of winning a prize. Tournament hosts may also receive the benefit of permanent, targeted advertising for their tournament and more participants.

The targeted advertising comes in the form of displayed business information and tournament information on the webpage, in addition to displaying virtual trophies and virtual plaques containing tournament information. The virtual trophies and virtual plaques may be linked to the tournament host's trophy room or a private web page for the tournament. Additionally, the tournament host may enjoy the opportunity to have face time with a market demographic more likely to enter the tournament host's specific tournament.

Additionally, the tournaments may be linked, either automatically by the database 62 or manually by the user, to create a comparison link. A comparison link may be displayed to the user to show a trophy room from different tournaments, a rank from different tournaments, a virtual trophy, a virtual plaque, or any other information the user or the certification partner may want displayed.

The method 20 may also assist water vessel captains including ship and charter boat captain in generating a manifest. Vessel captains may be required to complete accurate manifests containing information relating to the passengers on the vessel, expected destination, anticipated return time, and any other desirable information, which then may be filed with the coast guard or some other entity. The database 62 may be used to generate the manifest for the vessel captain if the individuals on the vessel uploaded their information to the database 62 through a 'manifest feature'.

The 'manifest feature' may work by in taking the information from the outdoorsman on the vessel, including contact information required for registration. The 'manifest feature' may then upload the contact information directly to a digital manifest which the ship captain may then file with the appropriate authorities. The outdoorsman utilizing the services of the captain may then only be required to access the portion of the database 62 associated with the outdoor experience, such as a charter fishing trip, and the manifest may then automatically be created for the benefit of the captain.

Having all or some of the outdoorsman participating in the outdoor experience having access to the database 62 may generate additional benefits. These benefits may include, but are not limited to, allowing outdoorsman to capture visual recordings of harvests under the direction of the captain and allowing outdoorsman to upload the visual recordings to the database 62. This may be a benefit because the captain, who may also be a certification partner, can direct others to certify the harvest and upload the certified harvest for the captain. The harvest may then upload automatically to the outdoorsman's trophy room and the captain's trophy room, or any other trophy room affiliated with the outdoor experience, such as the trophy room of other outdoorsman participating in the same outdoor experience.

Advantages of the method 20 should be readily apparent from detailed disclosure above. First, the method 20 may simplify the process of receiving certification or verification of a trophy game harvest. Second, the method 20 may provide a cheaper process for certification and additionally increase the number of certification partners available to assist outdoorsman. The first and second advantages represent major improvements to the current system of certification and verification of trophy game harvests.

The current system of certification charges high handling fees, certification fees, and licensing fees for the ability to certify trophy game harvests. Additionally, the current system has limited participants, meaning outdoorsman seeking certification must travel longer distances and spend more money to obtain certification. The current system caters to wealthy outdoorsman and outdoorsman living in or near areas where certification partners may be located. The method 20 may increase the amount of available certification partners by compensating the certification partner through a profit sharing incentive and free advertising, instead of charging licensing fees which are passed on to the outdoorsman. As such, not only is it more practical for the outdoorsman to use the present invention, but also more efficient and with reduced cost, all while obtaining the additional benefits outlined in this application.

FIG. 4 is representative of a social media platform 60 for displaying and ranking trophies taken by a plurality of users. Referring to FIG. 4, the social media platform 60 may include a database 62 containing a plurality of trophy entries uploaded by the plurality of users, each including user input information and a visual recording of the trophy entry. This includes collecting user input information concerning a trophy harvest. The user input information collected in accordance with the disclosed social media platform 60 may broadly include user identity data, equipment data, physical data, time data, and location data. This may further include receiving a visual recording of the trophy animal. User input information as well as the visual recording may be collected through a communication module 68 in communication with the database 62. The communication module 68 may connect with the database 62 to transmit information through an internet connection, a mobile application, or any other known form of electronic communication.

The visual recording may take the form of a photograph or a video of the trophy. The visual recording may also be used as a measure of verification wherein the trophy may be certified by viewing the visual recording. This may also include retrieving overlay data from a plurality of databases in response to collecting the time data and the location data. More specifically, retrieving overlay data includes retrieving a variety of environmental information based upon the time data and the location data of the trophy harvest. For example, environmental data including weather and moon phase information may be retrieved from other databases based upon the time and location data collected in accordance with the method disclosed. Accordingly, when the method collects the time and location data of a trophy animal harvest, the weather and moon phase information corresponding to that trophy harvest is automatically retrieved.

Referring to FIG. 4, the social media platform 60 may also include a ranking module 64 having executable instructions for ranking the plurality of trophy entries stored in the database 62 into a list of ranked trophy entries. The ranking module 64 operates by comparing at least a portion of the physical data of each trophy entry. Accordingly, the ranking module 64 may generate a list of ranked trophy entries. The list of ranked trophy entries may generally be arranged such that the most physically impressive and/or desirable trophy entry appears in a first position. For birds, they may be ranked by rarest to see, such as overall rarest, rarest in the geographical area and the like. The trophy entry occupying the first position may be followed by a plurality of sequential positions descending in impressiveness or desirability. Relative impressiveness or desirability and thus, how the trophy animals are ranked, is based upon the quantitative values of the physical data and in some instances location data. To rank the trophy entries and generate the list of ranked trophy entries, the ranking module 64 may perform the executable instructions.

The executable instructions of the ranking module 64 may include several features. For example, the ranking module 64 may compare the physical data of the single trophy entry to other physical data of other trophy entries stored in the database 62. As a result of the comparison, the ranking module 64 may rank the single trophy entry relative to the other trophy entries stored in the database 62. Multiple ranking schemes may be executed. For example, the ranking module 64 may stack rank the heaviest deer of all time by comparing the weight information contained in the single trophy entries for deer stored in the database 62.

Alternatively, the ranking module 64 may stack rank the heaviest deer taken today, this week, this month, or this year by comparing the weight information contained in all the trophy entries for deer taken within the relevant time period. It should be appreciated that the ranking module 64 can rank the trophy entries by any of the physical data criteria entered. The stack ranking may be more specific by limiting the ranking to a specific geographic location such as by county or by equipment used. For example, the ranking module 64 may stack rank all trophy deer taken by bow last year. Accordingly, every user can have their fifteen minutes of fame and can ascertain useful information in the form of stack rankings as the ranking module 64 can execute narrow ranking schemes restricted by specific equipment data, location data, time data entries, and other desirable characteristics.

The ranking module 64 may also rank other criteria to identify different statistical trends. The executable instructions of the ranking module 64 may compare trophy entries based on location data. For example, the ranking module 64 may rank the most productive counties or states for trophy deer hunting by comparing those producing the highest number of trophy deer entries in the past year. For instance, the ranking module 64 may stack rank the best ten counties in the United States for taking a trophy white-tailed deer.

As another example, the ranking module 64 may rank the most productive bodies of water for trophy bass fishing by comparing those producing the highest number of trophy bass entries in the past five years. For instance, the ranking module 64 may stack rank the best five lakes in Florida for catching trophy largemouth bass. Similarly, the ranking module 64 may rank the most productive guide services, lodges, camps, or other facilities used by users of the social media platform 60. In this way, the social media platform 60 disclosed provides an answer to the often asked question of "where do I stand the best chance of taking particular a trophy animal?"

The ranking module 64 of the social media platform 60 may also have executable instructions for ranking the trophy rooms of a plurality of users in addition to a single trophy entry, to generate a list of ranked trophy rooms. The executable instructions may rank the trophy rooms based on any number of desirable criteria such as the number of trophy animal entries presented in the trophy rooms or the number of different species of trophy animals presented in the trophy rooms. Accordingly, the trophy room of a user may be ranked compared to the trophy rooms of other users based on the total number of trophy animal entries presented in the trophy room.

Alternatively, the ranking may be based on the number of animal entries presented in the trophy room for a particular species of animal. For example, trophy rooms may be ranked based on the number of trophy deer entries presented. The trophy rooms may also be ranked based on the number of different species of animal accounted for by trophy entries presented in the trophy room. For example, trophy rooms may be ranked based on the number of different waterfowl species represented by the trophy entries presented in the trophy room. In this manner, a user may be recognized for the variety of trophy animals presented in their trophy room, not just the individual trophy.

The social media platform 60 may also include an output module 66 having executable instructions for outputting the ranked trophy entries and the list of ranked trophy entries to a social media user interface wherein the social media user interface includes a user page presenting the list of ranked trophy entries. The social media user interface provides a software interface allowing users to access and search the database 62 as well as upload trophy entries to the database 62. It should be appreciated that by accessing the database 62, the user can view the trophy entries uploaded to the database 62 by either the user or the other users.

The trophies, as well as any or all of the user input information, may be viewable on a display screen 70 in communication with the output module 66. It should also be appreciated that when a user uploads the trophy entry to the database 62 the trophy entry is permanently saved on the database 62 and that all or a portion of the trophy entry may become accessible to the other users.

Additionally, the output module having executable instructions may output the ranked trophy entries and list of ranked trophy entries to an external social media platform not affiliated with the database 62. This external social media platform may include, by way of example, websites such as Facebook®, Twitter®, and MySpace®, as well as social media mobile applications such as Pinterest® and InstaGram®. It should be noted that these are examples of social media platform websites and mobile applications and should not in any way be considered limiting.

The executable instructions of the output module 66 may include a variety of steps for establishing communication between the database 62 and the user device. Communication between the database 62 and the user device may take a wide variety of forms and may utilize a wide variety technologies and physical infrastructure. For example, the executable instructions of the output module 66 may establish wired or wireless communication between the database 62 and the user device via the internet. In the case of a mobile user device, wireless communication may be established via a wireless network such as WIFI or by a wide area service network such as WAN, 3G, or 4G wireless data services. In addition to establishing communication between the database 62 and the user device, the executable instructions of the output module 66 may include a variety of steps including outputting information, sending requests for information, and sending various operational commands between the database 62 and the user device to operate the social media platform 60.

The social media user interface and user page may take a variety of forms including but not limited to a webpage or a software application or a mobile application. Users can run the webpage or software application or mobile application on a variety of user devices such as but not limited to personal computers, laptops, pocket organizer devices, e-reader devices, cell phone devices, smart phone devices, and tablet devices. These devices generally may have a display screen 70 for displaying graphics and input means for entering information and selecting the graphics displayed on the display screen 70.

The user page may present the list of ranked trophy entries. The list of ranked trophy entries may display the visual recording and at least a portion of the user input information for each of the trophy entries presented in the list. The user page may also display multiple lists of ranked trophy entries ranked according to different ranking schemes. For example, the user page may display lists of ranked trophy entries for the top five deer taken in Alabama over the last ten days and the top twenty largemouth bass taken in the United States over the last five years. The lists of ranked trophy entries presented on the user page may also refresh in accordance with predetermined time intervals wherein different lists of ranked trophy entries are sequentially displayed on the user page.

The user page may also display news flashes which may include outdoors related articles or single trophy entries. For example, the news flashes may show single trophy entries selected as first kills, first catches, or top for today. 'First kill' or 'first catch' news flashes may correspond to those trophy entries representing the user's first taking of a trophy animal of any species or of a trophy animal of a specific species. Top for today news flashes may correspond to the highest ranked trophy entry for a given species uploaded to the database 62 within the past twenty four hour time period. These news flashes and lists of ranked trophy entries may be refreshed in predetermined time intervals and may be continuously updated to provide accurate rankings and information in real time.

The user page may also include a search feature allowing users to enter a search query. The search query may be for a particular user or for a particular list of ranked trophy entries. Accordingly, the user can search for the trophy entries upload by a particular user or may define specific data that the ranking module 64 will use to produce a particular list of ranked trophy entries. The user page may additionally include ad banners, navigational tools, and links presented as selectable graphics allowing users to navigate to various other pages of the social media platform 60.

The social media user interface may further include a user trophy room for each discrete user of the social media platform 60. The user trophy room may be populated with and presents all of the trophy animal entries uploaded by the discrete user over a pre-determined period of time. For example, the user trophy room for user John Doe may include all trophy animal entries ever uploaded by user John Doe or those uploaded by John Doe during the past ten years. It should be appreciated that the trophy animal entries presented in the user trophy room may include trophy animals from a wide variety of species. The user trophy room may additionally include a plurality of trophy walls.

Each trophy wall may include a portion of the trophy entries uploaded by the user selected based upon certain criteria. For example, the user trophy room may include a trophy wall for all trophy entries uploaded by the user in a given time period such as in a given year. Alternatively, the user trophy room may include a trophy wall for all trophy entries uploaded by the user for a certain species or category of animal.

For example, John Doe may have a trophy wall for all fish species and another trophy wall for all mammal species. John Doe may have a trophy wall for all trout and another trophy wall for all deer and another trophy wall for birds. Alternatively, John Doe may have a trophy wall for all trophy entries uploaded in 2012 and another for those uploaded in 2011 and so forth. It should be appreciated that the criteria for selecting the trophy entries for the trophy walls may be automatically provided by the social media platform 60 as default settings or may be customized by the user. Also, it should be appreciated that more than four trophy walls may be presented in the user trophy room.

Each of the trophy entries presented in the trophy room may display the visual recording of the trophy animal and at least a portion of the input information associated with that trophy entry. By selecting a particular animal entry, additional information may be displayed. For example, more of the user input information may be presented as well as the overlay data associated with the trophy entry in response to selection of the particular game entry. The user trophy room may further include a comment section where other users can provide written comments.

It should be appreciated that the user trophy room and the trophy walls are virtual elements of the social media user interface and are not meant to necessarily correspond with any structure or limitations commonly associated with the rooms and walls of a physical building. Also, the user trophy room and the trophy walls may be accessed by users in a variety of ways. A user may access the user trophy room of a particular user by entering a search query for the particular user using the search feature of the user home page. Alternatively, a user may access the user trophy room of a particular user by selecting a link to the user trophy page presented in the lists of ranked trophy animal entries or single trophy game entries. Accordingly, users can browse the trophy rooms of other users through use of the social media platform 60.

The social media platform 60 may additionally include a memory module. The memory module may store a variety of information including user preference information. The user preference information may include data concerning the user's use of the social media platform 60 including a viewing history of information accessed by the user and a search history of the search queries entered by the user. Accordingly, the social media platform 60 may tailor the lists of trophy entries and other information presented on the user page based upon the user identity data and the user preference information. For example, where a user lives in Texas and has entered search queries for largemouth bass taken in Texas and Louisiana in the past month, the user page for that user may include lists of the top ten largemouth bass taken in Texas and in Louisiana in the past month. In this way, the social media platform 60 tailors the user page to fit the interests of each user.

It should be appreciated that the social media platform 60 caters not only to hunters and fisherman but also to bird watchers and naturalists. The trophy entries need not correspond to animals killed or caught but could also include animals sighted or photographed. In accordance with the social media platform 60 presented above, these animal sightings may be recorded as animal entries in the database 62. Input information may be entered and overlay data may be retrieved. Accordingly, the social media interface functions in much the same way. Trophy rooms may be created showcasing the animals sighted by each user. The ranking module 64 may then rank the trophy rooms to generate a list of ranked trophy rooms. The trophy rooms may be ranked based on any number of desirable criteria such as the number of animal entries presented in the trophy rooms or the number of different species of animals presented in the trophy rooms. For example, the trophy rooms of bird watchers may be ranked based on the number of different bird species represented by the animal entries presented in the trophy rooms. Accordingly, a bird watcher may be recognized for their achievement of uploading a diverse number of bird species sightings to the database 62 as animal entries.

An animal sighting mobile application is also included within the social media platform 60. The animal sighting mobile application is configured to run on the mobile device of the user and enables the user to upload animal sightings to the database 62. Accordingly, this animal sighting mobile application may be used in conjunction with the social media platform 60 described above or by itself as a stand-alone application. Regardless, the animal sighting mobile application may provide useful information for identifying trends in animal numbers and animal activity levels. When used in conjunction with the social media platform 60, the animal sighting mobile application may also provide users with the opportunity to share the animals they have seen while spending time outdoors and not just those animals that they have taken.

The animal sighting mobile application may include a graphical user interface (GUI). The GUI may present a species entry feature for receiving an animal species of the animals sighted by the user. For example, the species entry feature may take the form of a drop down menu or a tumbler listing a plurality of animal species from which the user may select the species of the animal sighted. Alternatively, the species entry feature may take the form of a text box that the user can type in to enter the name of the species of the animal sighted. The GUI may also present an animal number feature for receiving a number of animals sighted by the user. Again, the animal number feature may take the form of a drop down menu or a tumbler listing a plurality of numbers from which the user may select the number of animals sighted. Alternatively, the species entry feature may take the form of a text box that the user can type in to enter the number of animals sighted. It should be appreciated that the animal number feature and the species entry feature are associated with each other such that the number of animals entered corresponds to those animals sighted of the species selected by the user. The GUI may also present a counter displaying the total number animals cited by the user for each species of animal entered using the species entry feature.

The GUI may additionally present a picture icon for taking a picture of the animals sighted by the user. To achieve this end, the animal sighting application may include a picture module having executable instructions. The executable instructions may include a series of commands or steps for capturing a visual recording using the mobile device. The executable instructions may be initiated on the mobile device by the picture module in response to selection of the picture icon by the user. It should also be appreciated that the visual recording may take the form of a photograph or a video of the animal or animals sighted by the user.

The animal sighting application may include an overlay data module. The overlay data module may have executable instructions for retrieving time data and location data from the mobile device. The overlay data module may initiate the executable instructions on the mobile device in response to receipt of the animal species and the number of animals sighted by the user. The animal sighting mobile application may also include a memory storage unit for storing animal sighting information including the visual recording, the overlay data, the animal species, and the number of animals sighted by the user.

The animal sighting application may also include a communication module. The communication module may have executable instructions for establishing a connection between the mobile device and the database 62. It should be appreciated that the connection between the mobile device and the database 62 may be a wired or a wireless connection. In response to establishing the connection, the communication module may upload the animal sighting information to the database 62. The animal sighting information can then be utilized by the social media platform 60 in accordance with the method previously described. Accordingly, the animal sighting information may be treated in the same manner as the information contained in the trophy animal entries described above.

As a result, the animal sighting mobile application can provide valuable information concerning animal numbers and animal behavior or activity level. Using the animal sighting information stored on the database 62, users may be able to identify the geographic locations where animal numbers are highest during a particular time of year. Users may also be able to identify a number of other trends such as how weather and time of day affects animal activity and movement. Above all else, the animal sighting mobile application will increase the amount of useful information stored on the database 62 and will give users something to do while sitting in the blind, tree-stand, or boat on days when the action is less than spectacular.

A mobile application may also be included within the social media platform 60. The mobile application may be an application that is downloaded from the database 62 to a phone, a tablet, or any other mobile device. The mobile application may be configured to run on the mobile device of the user and enables the user to communicate with the database 62. Accordingly, the mobile application may be used in conjunction with the social media platform 60 described above or by itself as a standalone application.

The mobile application may include an overlay data module. The overlay data module may have executable instructions for retrieving time data and location data from the mobile device. The mobile application may also include a communication module. The communication module may have executable instructions for establishing a connection between the mobile device and the database 62. It should be appreciated that the connection between the mobile device and the database 62 may be a wired or a wireless connection.

In response to establishing the connection, the communication module may automatically upload time data and the location data which the overlay data module retrieved. It should be understood that this automatic uploading of time data and location data could be in error due to lack of adequate cellular reception for the mobile device, lack of adequate power, lack of time, or other factors at the original location, and such automatically uploaded information may be associated with the current location which is not the harvest location. Therefore, it should be appreciated that the user may manually adjust the time data and location data within the social media platform to correct any errors automatically uploading of the overlay data may cause, such as gaps in time between harvest and uploading. Additionally, it should be appreciated that the user identity data, including a name or contact information for the user, may be automatically retrieved from the memory storage unit of the mobile device, but the user identity data may be manually corrected as needed.

The mobile application may include a picture module for capturing a visual recording. Desired parameters for capturing a visual recording may be pre-set into the picture module to simplify the process of capturing a visual recording. The information uploaded from the mobile application may then be utilized by the social media platform 60 in accordance with the method previously described.

The mobile application may include a graphical user interface (GUI). The GUI may present a 'witness' feature. As used herein, 'witness' application and 'witness' feature are synonymous. When an outdoorsman makes a trophy game harvest, the outdoorsman may take the trophy animal to a third party witness to be verified and uploaded to the database or identified as a verified trophy game entry. A witness may be an individual registered to access the database. It should be appreciated that throughout this application, the terms 'verification' and 'witness' may be used interchangeably. For example, if it is stated that a user may have their trophy game harvest 'verified' or having undergone 'verification', this should be read the same as having the trophy game harvest 'witnessed'.

Verification may be used any time it is not feasible to transport the trophy game harvest over a distance to a certification partner, or any time, the trophy game harvest will be released, or in other similar circumstances when a witness may be available. Additionally, more than one outdoorsman may witness a harvest. Two or more witnesses may verify the harvest, thereby providing even more credibility for the harvest. By way of example, verification will add credibility to catch-and-release fishing because any fish harvest may be photographed and verified by a third party witness or witnesses or to tranquilize-and-release hunting because any trophy harvest may be photographed and verified by a third party witness or witnesses.

To utilize the 'witness' feature, the third party witness may only be required to indicate the trophy game harvest is 'witnessed' or 'verified' using the GUI of the mobile application. A witness button may be available to assist the witness in utilizing the witness feature.

If size and quality measurements cannot be taken for the harvest, an estimate feature may allow the outdoorsman or witnesses to estimate the size and quality measurements for the harvest. This may work, for example, in catch-and-release fishing with a scale, or when targeting large fish that are generally not brought into the boat under if the fish is to be released, such as a sail fish or a marlin. Additionally, this may work in tranquilize-and-release hunting when a trophy animal cannot be killed and taken to a certification partner.

To utilize the estimate feature, the outdoorsman estimating the size of the harvest may simply indicate a size and/or quality measurement using the GUI of the mobile application. If the harvest generates multiple estimates, the mobile application may average the estimates. Many of the features present in the 'witness' feature are similar to the features discussed for the hunting club application 100 below, including the harvest icon, picture module, communication module, and the overlay data module.

The mobile application may include an accomplishment feature for a certification partner. The accomplishment feature may act as certification that the outdoorsman has achieved some desirable result with their trophy game harvest. When a certification partner certifies a trophy game harvest, the certification partner may indicate, via the use of an interface button displayed through the GUI, the outdoorsman has achieved a certain accomplishment. The accomplishment may automatically be entered in the trophy room of the outdoorsman, which may include the business information of the certification partner.

Accomplishments may include, but are not limited to, 'first fish', 'biggest fish', 'first deer', 'first buck', or the outdoorsman's first time taking a specific species, or the largest or a given species, taken by the outdoorsman. By way of example, if an outdoorsman harvested their first deer, the certification partner may indicate the accomplishment by selecting 'first deer' and 'biggest deer' for the outdoorsman. The accomplishment may automatically upload to the trophy rooms of the certification partner and the outdoorsman, both containing the business information for the certification partner.

The social media platform 60 may additionally include a 'harvest' feature permitting the user to communicate harvest information with a state agency. State agency as used herein may include state governments, federal governments, or any other wildlife agencies, or may also include other government entities, such as the coast guard or national guard, and that these terms may all be used interchangeably. To utilize the harvest feature, the outdoorsman may only be required to indicate the trophy game harvest is 'harvested' using the GUI of the mobile application.

The harvest feature may additionally provide automatic uploading of the trophy game animal to a state harvest database or be logged into an agency database, thereby eliminating the need for the outdoorsman to transport the trophy game harvest to a check station for verification, inspection, and recordation. The harvest feature may increase the number of registrations in states where registration of certain game animal is mandatory as well as recommended, thereby providing more accurate data for the state. The outdoorsman may still take the trophy game harvest to a certification partner to become a certified trophy game entry or take the trophy game harvest to a witness to become a verified trophy game entry after registering the trophy game harvest with the state agency.

The database 62 may additionally provide real-time updating from the state agency to the outdoorsman for any outdoorsman registered with the database 62. The state agency may require individuals desiring to purchase a permit for a restrict hunt to connect to the database 62. The state agency may then automatically intake harvest information as it is uploaded by the outdoorsman, as well as providing real-time updates to the outdoorsman. The updates may include information relating to length of the season, weather conditions, largest harvests of the season, or that the harvest limit has been achieved and the season is closed. The state agency may therefore be aided by providing the state agency the most accurate information from the outdoorsman and the outdoorsman is provided accurate information from the state agency.

Figure 12:
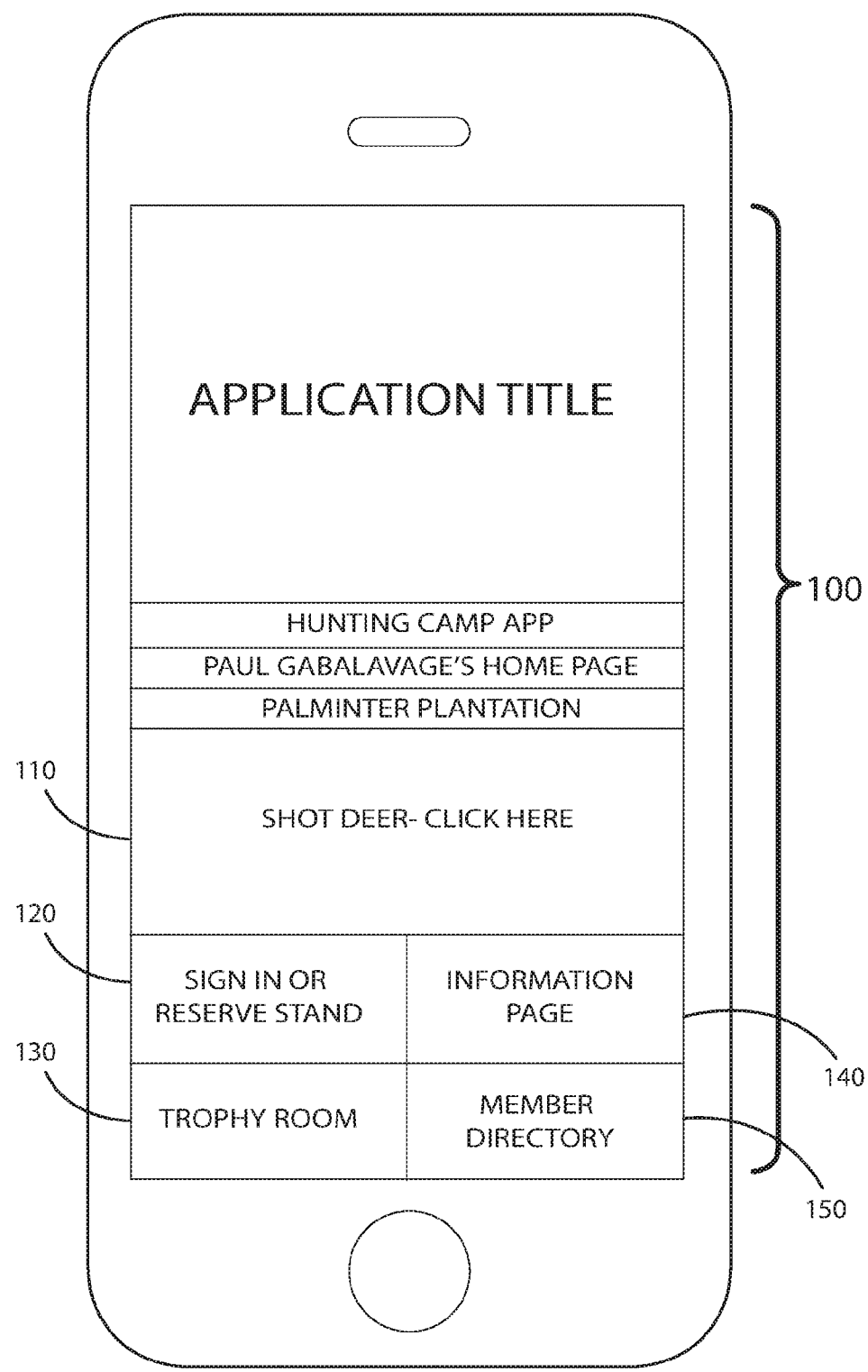
FIG. 12 is a screenshot illustrating an exemplary mobile hunting club application.

As shown in FIG. 12, a hunting club application 100 may also be included within the social media platform 60. The hunting club application 100 may be configured to run on the mobile device of the user and enables the user to communicate with the database 62. Accordingly, the hunting club application 100 may be used in conjunction with the social media platform 60 described above or by itself as a stand-alone application. Additionally, and as will be discussed in further detail below, the hunting club application 100 contains several individual applications, referred to as icons within the hunting club application 100. The features of the icons may be used in their entirety or in any amount to comprise the hunting club application 100. However, it should be appreciated that each of the icons is a separate application making up the hunting club application.

The hunting club application 100 may be used for various forms of hunting and fishing including, but not limited to, turkey hunting, duck hunting, goose hunting, fishing trips, moose hunting, etc. However, it should be appreciated the following descriptions for the hunting club application 100 will primarily use deer hunting by way of example. It should be understood that deer hunting is being used in an exemplary, and not a limiting, manner.

The hunting club application 100 may include a graphical user interface (GUI). The GUI may present a hunting club application 100 home page. The hunting club application 100 home page may contain individual page entry icons from which the user may select to transfer the user from the hunting club application 100 home page to a new screen. For example, the individual page entry icons may include a harvest icon 110, a tree stand icon 120, a trophy room icon 130, an information icon 140, or a member directory icon 150. The individual page entry icons may additionally take the form of a drop down menu or a tumbler listing a plurality screens from which the user may select.

Figure 13:
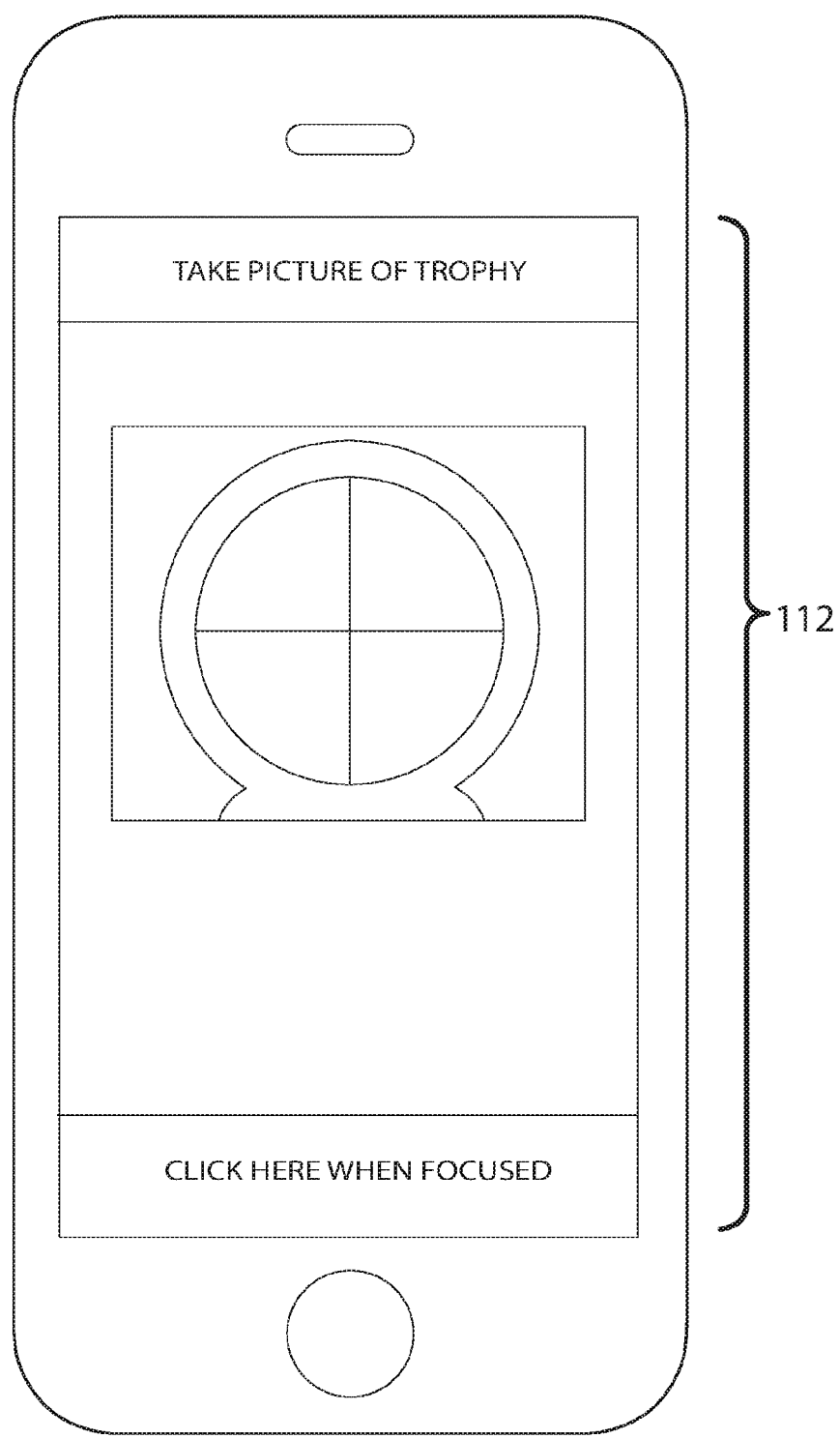
FIG. 13 is a screenshot illustrating a first harvest screen of an exemplary mobile application.
Figure 14:
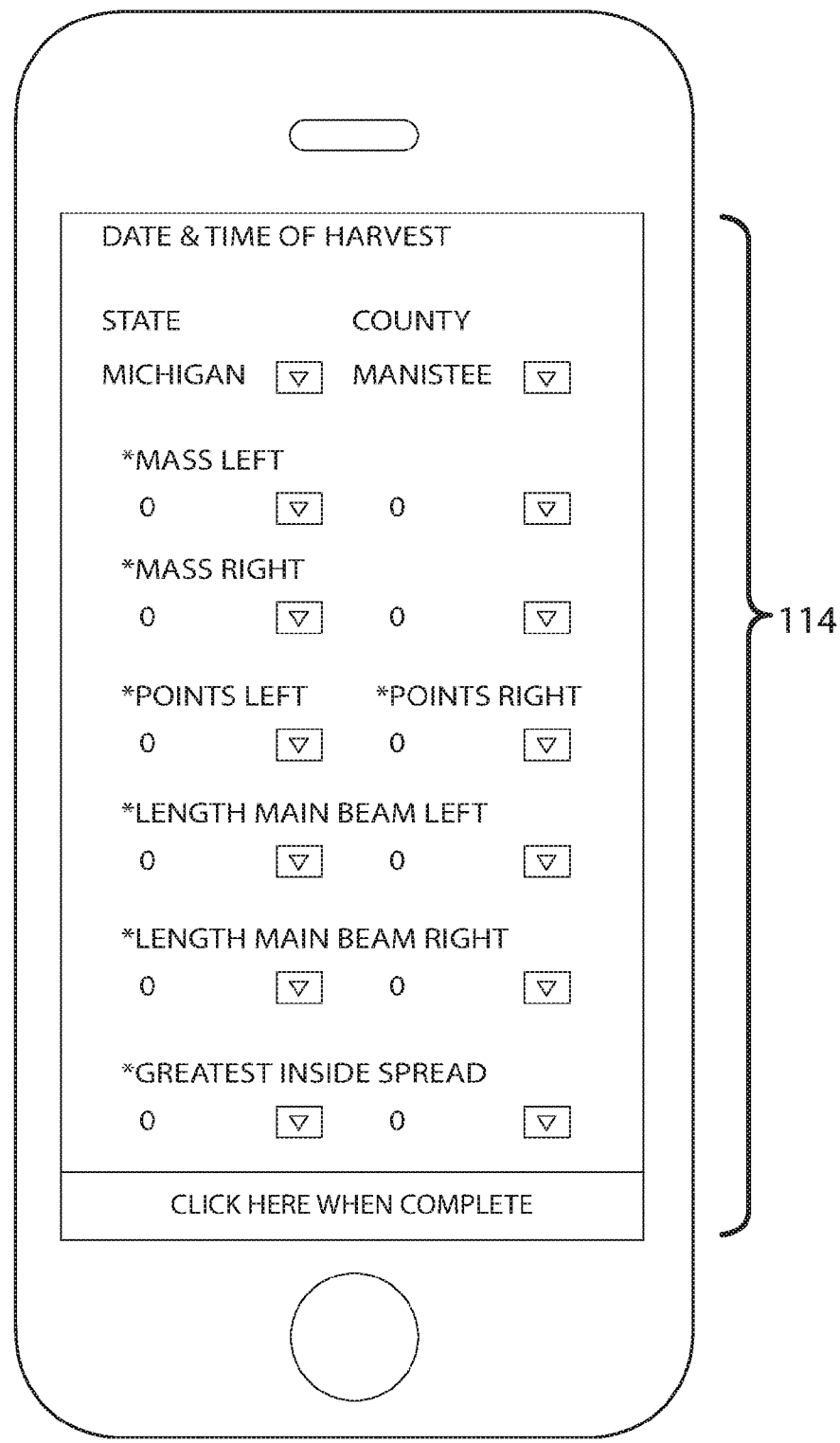
FIG. 14 is a screenshot illustrating second harvest screen of an exemplary mobile application.

A harvest icon 110 may be selected from the individual page entry icon displayed on the hunting club application 100 home page. As shown in FIGS. 13 and 14, engaging the harvest icon may display a first harvest screen 112 and a second harvest screen 114. The first harvest screen 112 may include a picture module having executable instructions. The executable instructions may include a series of commands or steps for capturing a visual recording using the mobile device. It should also be appreciated that the visual recording may take the form of a photograph or a video.

The second harvest screen 114, as shown in FIG. 14, may present a plurality of drop down menus or tumblers listing a plurality of size and quality measures the user may complete through the GUI. The size and quality measurements may include location data, time data, and other size or quality information. For a deer, the size and/or quality measurement information may include mass of the left antler, mass of the right antler, length of the left antler main beam, length of the right antler main beam, greatest inside spread, and any other size and quality measurements. Additionally, the second harvest screen 114 may also include an overlay data module.

The overlay data module may have executable instructions for retrieving time data and location data from the mobile device. The overlay data module may initiate the executable instructions on the mobile device in response to receipt of the visual recording from the first harvest screen and automatically populate the data into the second harvest screen, allowing the user to manually alter or not alter the time data and location data.

The hunting club application 100 may also include a memory storage unit for storing size and quality measurements, the visual recording, and the overlay data generated when the harvest icon is utilized. The hunting club application 100 may also include a communication module. The communication module may have executable instructions for establishing a connection between the mobile device and the database 62. It should be appreciated that the connection between the mobile device and the database 62 may be a wired or a wireless connection. The hunting club application 100 may use a private wireless network set up by the camp or club, particularly as many clubs are located in areas of poor cellular signal.

In response to establishing the connection, the communication module may upload the size and quality measurements, the visual recording, and the overlay data to the database 62. The size and quality measurements, visual recording, and the overlay data can then be utilized by the social media platform 60 in accordance with the method previously described. The communication module may be used for a variety of other communications, including tornado or thunderstorm warning, position information, or any other useful information.

Accordingly, the uploaded data may be treated in the same manner as the information contained in the trophy animal entries described above. As a result, the hunting club application 100 may provide valuable information concerning when the trophy game was harvested, where the trophy game was harvested, and the size of the trophy game harvest.

Using the uploaded data stored on the database 62, other users may be able to identify the geographic locations where animal numbers are highest during a particular time of year. Users may also be able to identify a number of other trends such as how weather and time of day affects animal activity and movement. Additionally, users may be able to know when other members of their camp have taken a trophy game harvest.

A tree stand icon 120 may be selected from the individual page entry icons displayed on the hunting club application 100 home page. It should be appreciated that the term tree stand is exemplary of a device, man-made or natural, which aids the outdoorsman in taking the trophy game harvest. Therefore, the term tree stand should be interpreted to encompass a broad array of devices, which may include but are not limited to, hunting blinds, ground stands, fishing shacks, shanties, pop-ups, elevated blinds, or any other means of wholly or partially concealing the outdoorsman image, silhouette, scent, or sound from the game animal.

Figure 15:
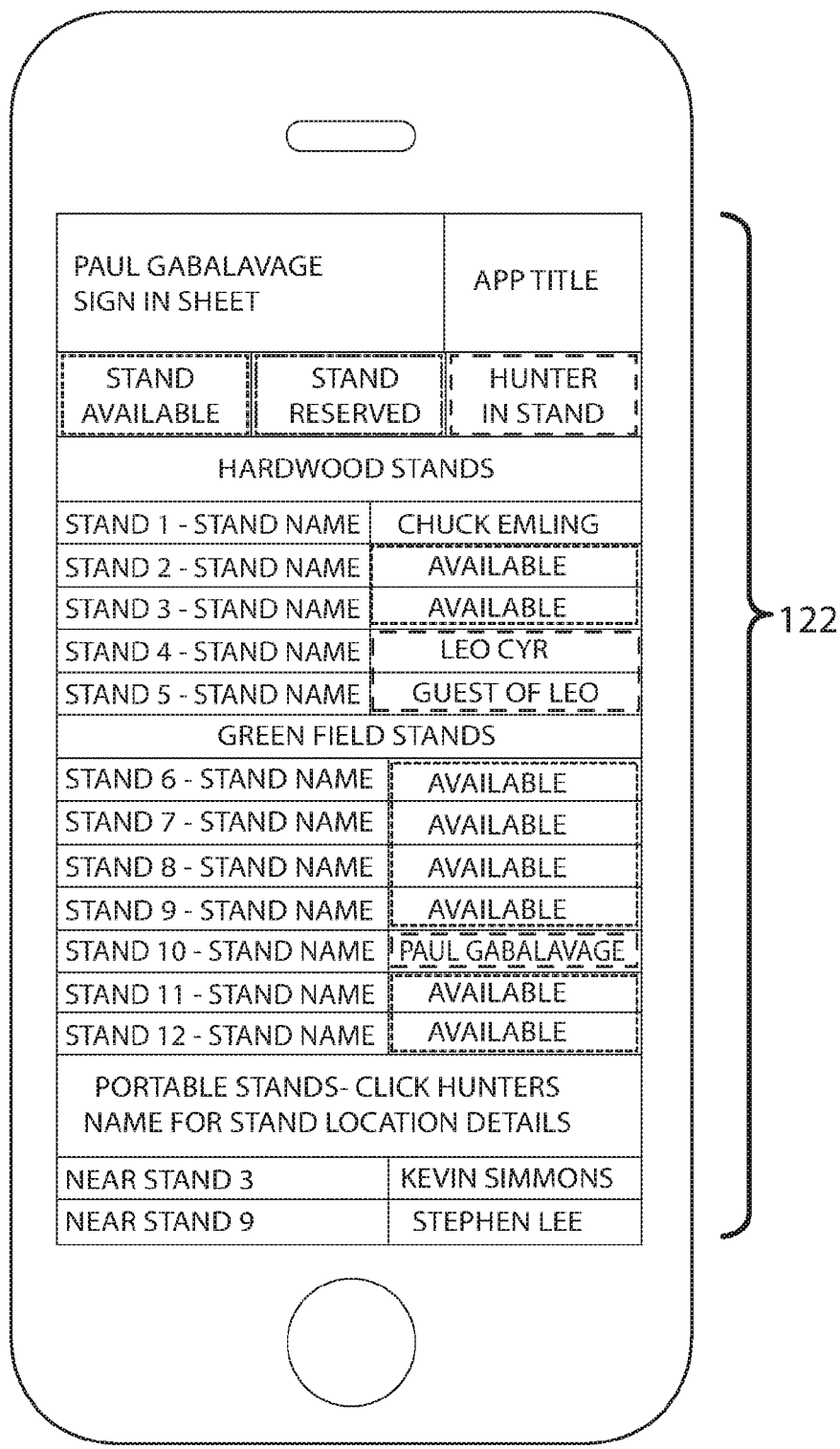
FIG. 15 is a screenshot illustrating a status stand screen of an exemplary mobile application.

As shown in FIG. 15, engaging the tree stand icon 120 may display an all stands screen 122. The all stands screen 122 may present a plurality of individual stands, drop down menus containing a plurality of individual stands, or tumblers listing a plurality individual stands the user may select through the GUI. Each of the plurality of individual stands may represent a single stand uploaded to the hunting club application 100 by a user.

The all stands screen 122 may display information concerning each of the plurality of stands, including name, location, whether another user is presently in the individual stand, whether the individual stand is empty, and whether the stand is reserved and a directional vector for the direction the individual stand faces. By way of example, the display of the plurality of individual stands may include 10 individual stands, each displaying a name given to the stand by a user, the location relative to other stands, a landmark, a stand of trees, a road, or any other means for determining location, a direction the stand is facing with a vector, and displaying the present and future occupancy of the stand.

Figure 16:
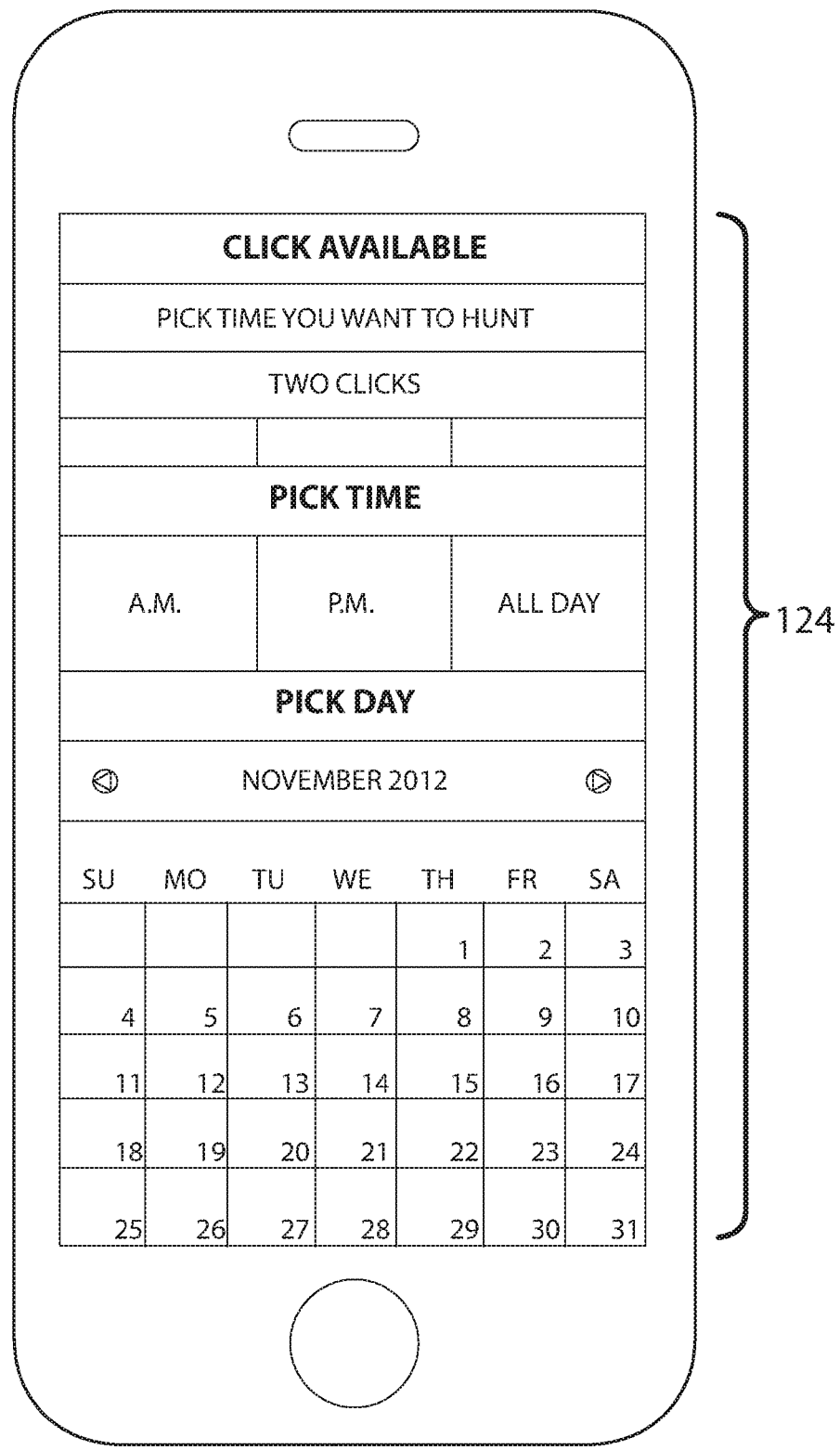
FIG. 16 is a screenshot illustrating a reserve stand screen of an exemplary mobile application.

If an individual stand is selected through the GUI from the plurality of individual stands, more detailed information will be presented to the user in a reserve stand screen 124. As shown in FIG. 16, the reserve stand screen 124 may display a captured image portraying the selected individual stand as well as displaying an interactive method to reserve the individual stand. The stand may be reserved by a calendar utilizing the GUI, or an interactive notepad on which the user may indicate when the individual stand is reserved.

If the user is utilizing a portable stand, rather than one of the plurality of individual stands, the user may upload a location to the all stands screen through the GUI. Uploading this information will indicate to other users with access to the hunting club application 100 where the user is with the portable stand and when the user may be at or near the uploaded location. Additionally, the user may include notes when uploading a location to the all stands screen. Such notes may include, but are not limited to, general descriptions of the location, exact descriptions of the location, time estimates for use of the location, or any other information the user wants others to view. For example, the user may upload a portable tree stand to the all stands screen and include in the notes the portable tree stand is 100 yards north of a landmark, such as a fence, another stand, a road, or any other identifiable feature.

Figure 17:
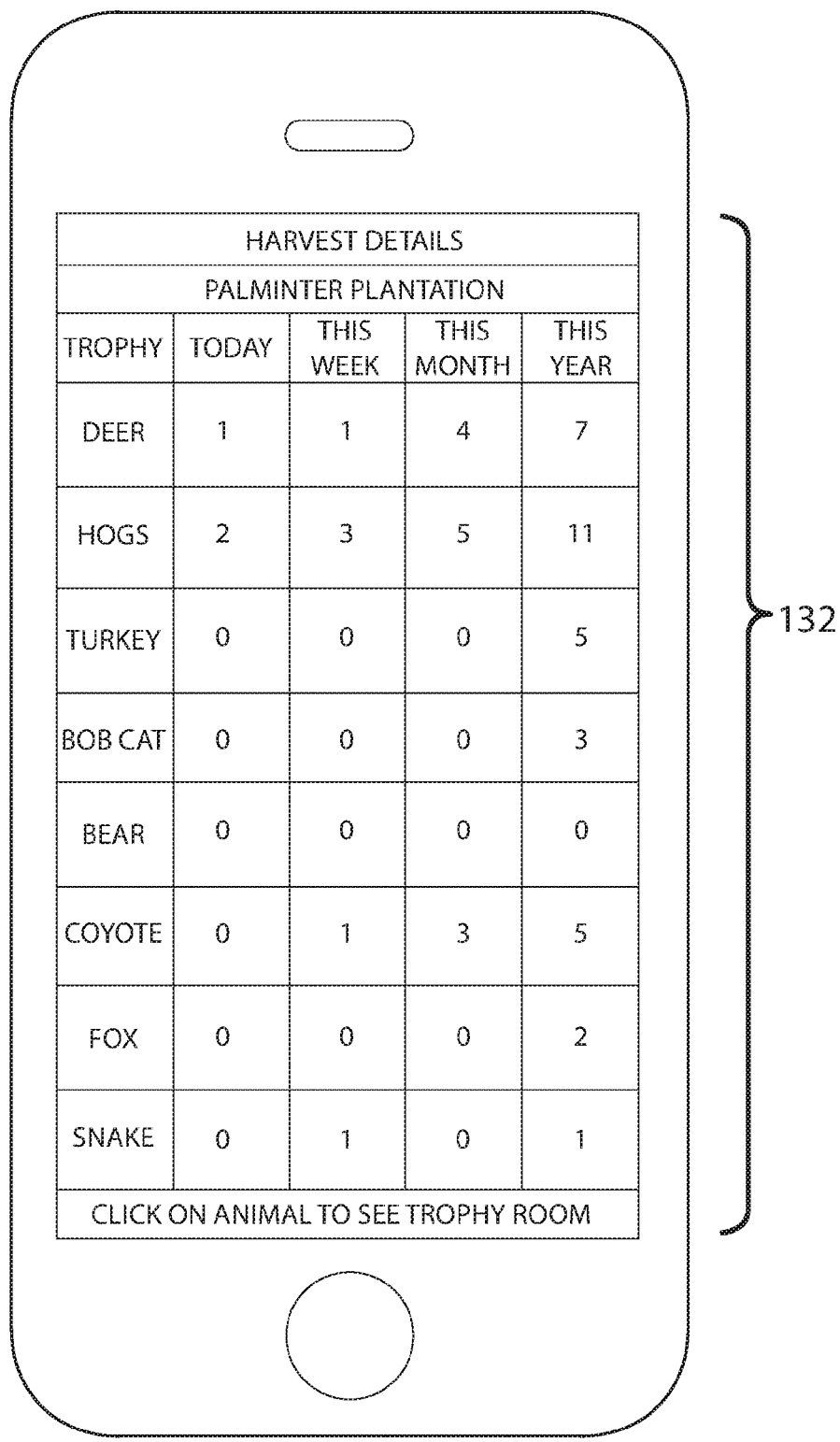
FIG. 17 is a screenshot illustrating a trophy room of an exemplary mobile application.

A trophy room icon 130 may be selected from the individual page entry icons displayed on the hunting club application 100 home page. Engaging the trophy room icon may display an individual user's trophy room 132, as shown in FIG. 17. The user may access information from the database 62, including whether any other users have harvested trophy game from their camp or area as soon as this information is uploaded to the database.

If other users from the same camp as the user have harvested trophy game, the user may automatically be notified through the communication module of the hunting club application 100. Additionally, the user may disable automatic notification and instead manually check the camp trophy room 132 or the other user's trophy room(s) 132 simply by engaging the trophy room icon 130 from the hunting club application 100 home page. The full range of trophy room features discussed above for the social media platform 60 may also be available to the user.

Figure 18:
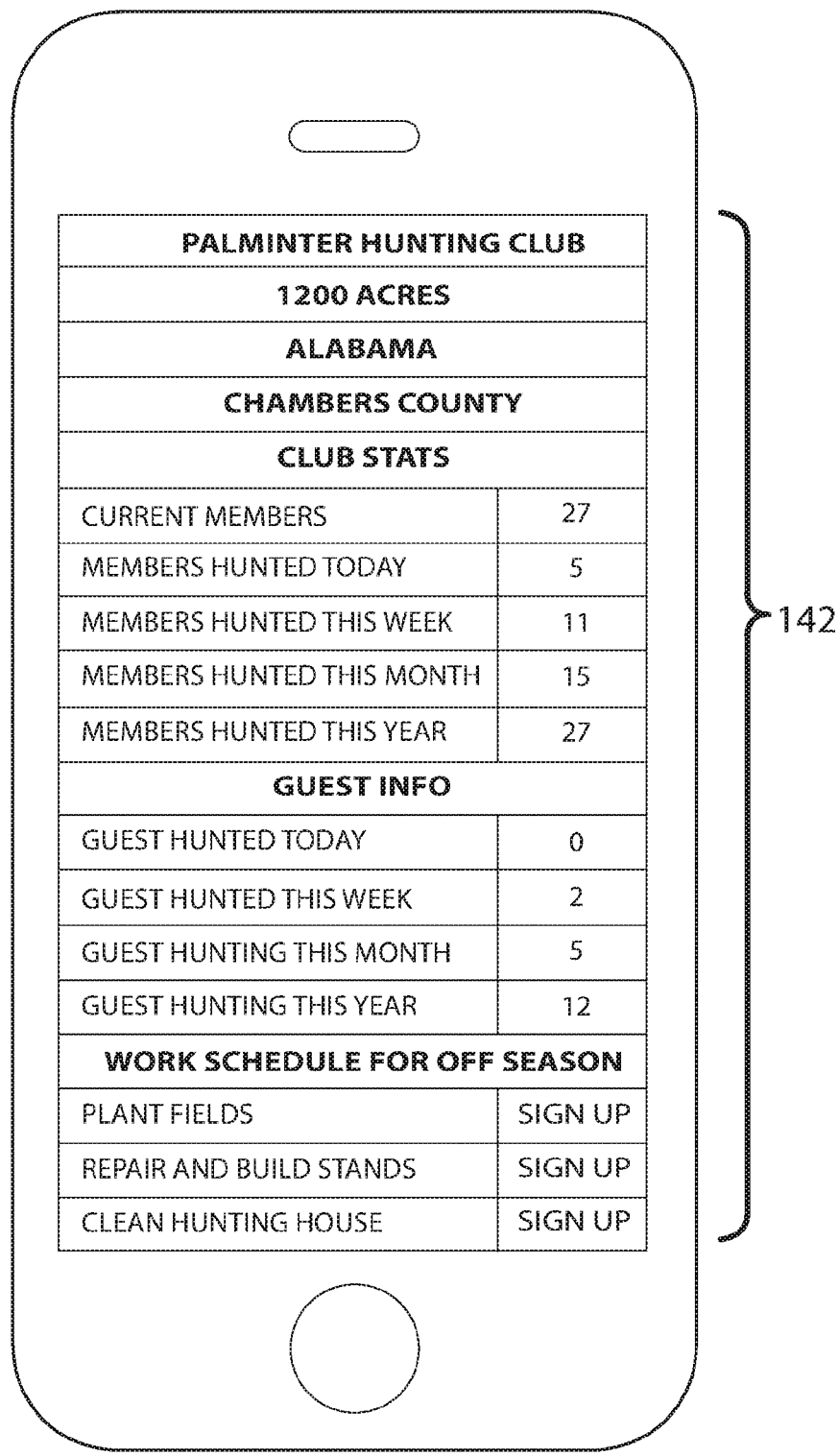
FIG. 18 is a screenshot illustrating camp information in an exemplary mobile application.

An information icon 140 may be selected from the individual page entry icons displayed on the hunting club application 100 home page. Engaging the information icon 140 may display camp information 142 regarding the user and the user's hunting club. The displayed camp information can be seen in FIG. 18. Displayed camp information 142 may include name of the user and name of the hunting club; total land size owned or leased or rented by the hunting club; total land size the hunting club is leasing or renting or preparing to sell to others; public lands within a predetermined vicinity of the hunting club; location of the hunting club including state, county, and country, as well as latitude and longitude of the hunting club.

Additional displayed camp information 142 may include statistics for members of the hunting club and guests of hunting club members, with statistics including total number of members and total number of guests that have hunted on any given day, week, month, year, or hunting season; guest information including names and contact information; harvest information including total numbers, dates, sizes, and any other pertinent information; work scheduling for off-season and on-season times, which may include sign up for planting fields, repairing individual stands, creating individual stands, cleaning the hunting club, baiting individual stands, felling trees, splitting wood, acquiring gas, oil, or other heat sources, collecting water, disposing of waste, or any other activity or activities necessary to operate a hunting club or comply with regulations.

Figure 19:
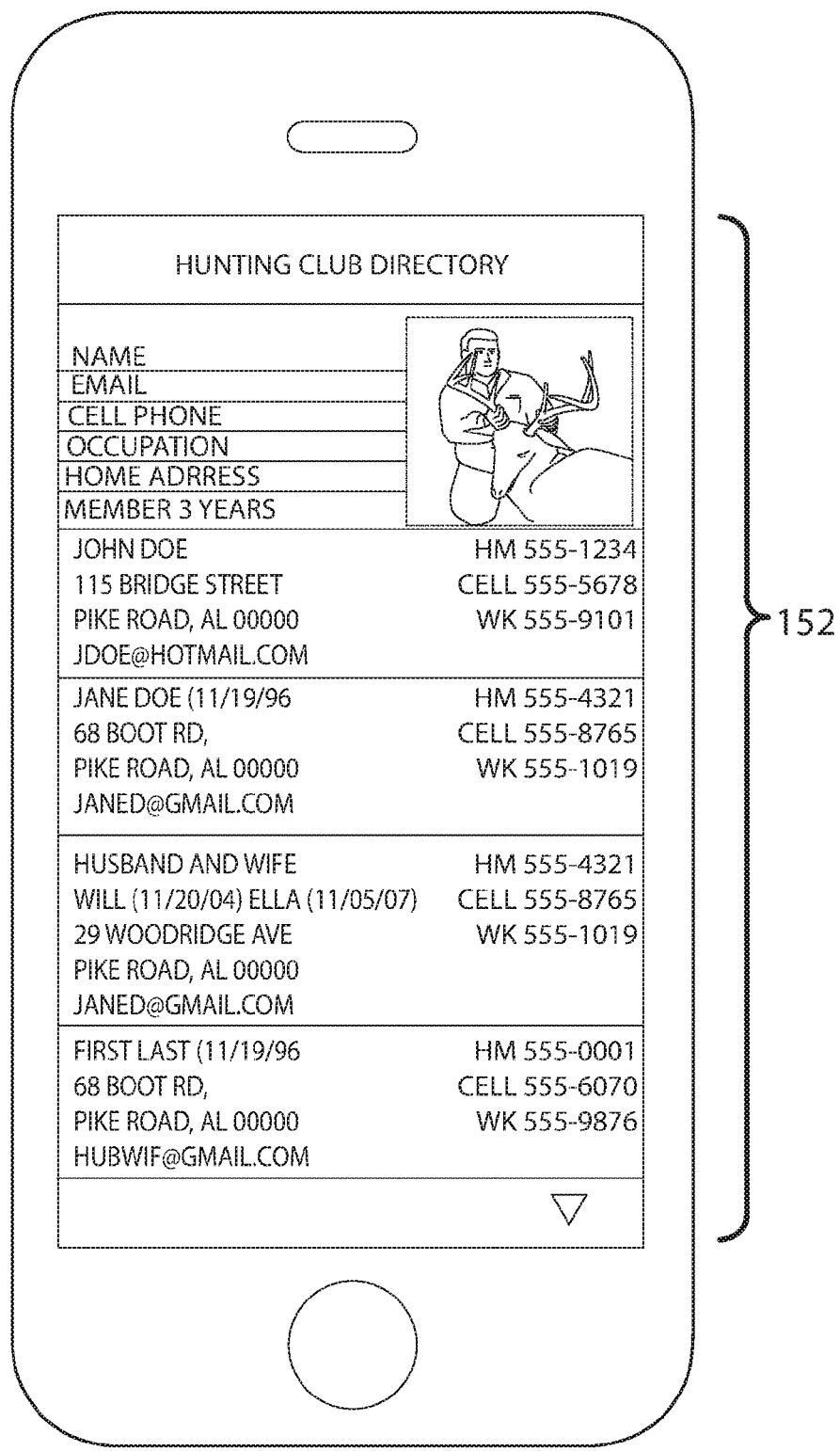
FIG. 19 is a screenshot illustrating member information in an exemplary mobile application.

A member directory icon 150 may be selected from the individual page entry icons displayed on the hunting club application 100 home page. Engaging the member directory icon 150 may display useful member information 152 regarding the members of the hunting club. FIG. 19 shows an exemplary page illustrating the displayed useful information.

Useful member information 152 may include the names of members; the names of member's spouses; home address, email address, telephone numbers, or any other necessary contact information for members; occupation of members; length of individual memberships; any amount of dues remaining owed by individual members, harvest statistics for individual members, a link to the trophy room for each individual member, and any other information users find important or necessary.

All or a portion of the features discussed above may collectively be considered a tree stand log. The primary benefit of the tree stand log is that the tree stand log may dramatically increase safety by automatically updating users, using the communication module of the hunting club application 100, of the location of other users. It should be appreciated by outdoorsman that the tree stand log has other benefits, including but not limited to, efficiency, productivity, and revenue raising.

In addition to tracking location of the users, the tree stand log may also rank the individual stands by any of the previously discussed size and quality measurements or other ranking schemes, providing the user(s) statistics for the most productive individual stands, including which individual stand produces the largest deer, which individual stand produces the most deer, what is the best time to hunt certain individual stands, what are the best weather conditions in which to hunt in certain individual stands, what is the best windage in which to hunt in certain individual stands, or any other useful information for the user. Additionally, via the communication module, any trophy game harvest may automatically be uploaded to the database 62 and the user's trophy room or the camp trophy room, or both, which will include the various ranking information for the plurality of individual stands. Such information may allow a club to charge a premium for certain individual stands or other schemes of allocating the best individual stands at the desired times.

As discussed above, the hunting club application 100 icons may also be accessed as standalone applications independent of the hunting club application 100. The harvest icon 110, the tree stand icon 120, the trophy room icon 130, the information icon 140, or the member directory icon 140 may each be an independent application running autonomously on the mobile device.

Obviously, many modifications and variations of the present invention are possible in light of the above teachings and may be practiced otherwise than as specifically described while within the scope of the appended claims. Although the steps of the method set forth herein are presented in a particular order, many variations in the order of the steps are possible. Accordingly, the present invention is not limited to the particular order of the method steps presented herein.

What is claimed is:

1. A social media platform accessible by a user for displaying and ranking trophies taken by a plurality of users, said social media platform comprising:
    a database containing a plurality of trophy entries uploaded by the plurality of users, each including user input information and a visual recording of the trophy entry;
    a ranking module having executable instructions for ranking said plurality of trophy entries stored in a database into a list of ranked trophy entries;
    an output module having executable instructions for outputting said ranked trophy entries and said list of ranked trophy entries to a social media user interface and wherein said social media user interface includes a user page presenting said list of ranked trophy entries; and
    wherein said social media platform performs the steps of:
        automatically acquiring overlay data wherein said input information includes at least one of a location data, a physical data, an equipment data, a user identity data, or a time data;
        said location data includes at least one of a country and a state or physical data includes at least one of a species identification and a size measurement, or a quality characteristic;
        said equipment data includes at least one of a weapon, a bait, an attractant, a camera, a lens, a film, a light sensitivity, an aperture, a tackle type, a lure type, a type of line, a type of rod, a type of reel, a type of bait, a fish attractant used, name of a guide service, the name of a lodge, name of a camp, or a name of a facility used;
        said overlay data is based on at least one of the time data or the location data, and wherein said overlay data includes at least one of a pressure, a precipitation, a moon phase, a temperature, a wind chill, a heat index, a sunset time, or a sunrise time.

2. The social media platform of claim 1 wherein said social media user interface includes a user trophy room for each of the plurality of users populated with said trophy entries uploaded by the user.

3. The social media platform of claim 2 wherein said user trophy room displays all said trophy entries uploaded by the user according to predetermined criteria and wherein each of said trophy entries presented in the trophy room are associated with said visual recording and at least a portion of said input information.

4. The social media platform of claim 2 wherein said trophy entries are automatically displayed in at least one of said user trophy room and a certification partner trophy room when said trophy entries are communicated to said database.

5. The social media platform of claim 4 wherein the user is automatically notified when the trophy entries are communicated to said database.

6. The social media platform of claim 1 wherein said ranking module has executable instructions for ranking said trophy animal entries stored in said database further includes ranking by comparing at least a portion of said physical data of each trophy entry to generate a list of ranked trophy entries.

7. The social media platform of claim 1 wherein said social media user interface including a user page presenting said list of ranked trophy entries further includes said list displaying said visual recording and at least a portion of said input information for each of said trophy entries presented on said list of ranked trophy entries.

8. The social media platform of claim 1 wherein said output module further includes a communication module for alerting users when another user harvests a trophy entry.

9. The social media platform of claim 1 wherein said output module further includes a outputting said ranked trophy entries and said list of ranked trophy entries to an external social media platform.

10. The social media platform of claim 1 wherein said output module having executable instructions includes outputting said input information to an agency for logging into an agency database.

11. The social media platform of claim 10 further including receiving a communication from said agency.

12. The social media platform of claim 1 further includes a witness application wherein said witness application is configured to operate on a mobile device and wherein said witness application further includes a graphical user interface displaying user engageable content on said mobile device.

13. The social media platform of claim 12 wherein engaging said witness application displays at least one of a first harvest screen comprising a picture module for capturing a visual recording and a second harvest screen for entering size and quality measurements for the trophy game harvest.

14. The social media platform of claim 13 wherein said second harvest screen may include at least one of an overlay data module for retrieving time data and location data and a communication module for establishing a connection between said mobile device and said database.

15. The social media platform of claim 1 further including a manifest feature for acquiring contact information for at least one of the plurality of users and automatically generating a manifest.

16. The social media platform of claim 15 wherein said manifest feature automatically uploads said manifest to at least one of said database and an agency.

\* \* \* \* \*